(12) United States Patent
Aguado et al.

(10) Patent No.: US 9,984,488 B2
(45) Date of Patent: May 29, 2018

(54) ANIMATING A VIRTUAL OBJECT IN A VIRTUAL WORLD

(71) Applicant: NaturalMotion Ltd., Oxford (GB)

(72) Inventors: Alberto Aguado, Aston (GB); James Edward John Brewster, Sidmouth (GB)

(73) Assignee: NaturalMotion Ltd., Oxford (GB)

( * ) Notice: Subject to any disclaimer, the term of this patent is extended or adjusted under 35 U.S.C. 154(b) by 0 days. days.

(21) Appl. No.: 15/421,818

(22) Filed: Feb. 1, 2017

(65) Prior Publication Data
US 2017/0221249 A1 Aug. 3, 2017

(30) Foreign Application Priority Data
Feb. 1, 2016 (GB) .................................. 1601775.8

(51) Int. Cl.
G06T 13/00 (2011.01)
G06T 13/40 (2011.01)

(52) U.S. Cl.
CPC .......... *G06T 13/40* (2013.01); *G06T 2213/12* (2013.01)

(58) Field of Classification Search
None
See application file for complete search history.

(56) References Cited

U.S. PATENT DOCUMENTS

| 6,088,042 A | 7/2000 | Handelman et al. |
| 2005/0041030 A1 | 2/2005 | Isner |

(Continued)

FOREIGN PATENT DOCUMENTS

| CN | 104851126 | 8/2015 |
| EP | 0827115 | 3/1998 |

(Continued)

OTHER PUBLICATIONS

"United Kingdom Application Serial No. 1601790.7, Combined Search and Examination Report dated Jul. 26, 2016", 6 pgs.

(Continued)

*Primary Examiner* — Frank Chen
(74) *Attorney, Agent, or Firm* — Schwegman Lundberg & Woessner, P.A.

(57) ABSTRACT

A computer implemented method for use in animating parts of a virtual object in a virtual world, the method comprising accessing joint data for each joint of a chain of joints associated with parts of a virtual object, joint data including length data defining a vector length for a vector from the joint to a next joint, the length data corresponding to a length of a part in the virtual world; accessing data for a target curve for use in defining possible target locations for the joints of the parts of the virtual object; and processing the joint data to set a location of a first joint at a first end of the chain to location of a first end of the target curve; define an end target location on the curve for an end joint at a second end of the chain; define intermediate locations on the curve for joints intermediate the ends of the chain based on the lengths of the vectors along the chain; and for a number of iterations, repeatedly identify a joint at a location having a largest location error relative to an intermediate location on the curve for the joint; rotate a vector for a preceding joint in the chain to minimize a distance between the end joint and the intermediate location on the curve; rotate a vector for the identified joint to minimize the distance between the end joint and the end target location on the curve; identify a joint at a location having the largest location error relative to an intermediate location on the curve for the joint; and determine a rotation to be applied to the vector for the first joint and the vector for the identified joint to fit the end joint to (Continued)

the end target location, and rotating the vector for the first joint and the vector for the identified joint to fit the end joint to the end target location.

20 Claims, 17 Drawing Sheets

(56) References Cited

U.S. PATENT DOCUMENTS

| | | |
|---|---|---|
| 2009/0002376 A1 | 1/2009 | Xu et al. |
| 2010/0259546 A1 | 10/2010 | Yomdin et al. |
| 2017/0042717 A1 | 2/2017 | Agrawal et al. |
| 2017/0221248 A1 | 8/2017 | Aguado et al. |
| 2017/0221250 A1 | 8/2017 | Aguado et al. |
| 2017/0221251 A1 | 8/2017 | Aguado et al. |

FOREIGN PATENT DOCUMENTS

| | | |
|---|---|---|
| GB | 2546814 | 8/2017 |
| GB | 2546815 | 8/2017 |
| GB | 2546817 | 8/2017 |
| GB | 2546820 | 8/2017 |
| JP | 09237351 | 9/1997 |
| WO | 2006113787 | 10/2006 |

OTHER PUBLICATIONS

U.S. Appl. No. 15/421,899, filed Feb. 1, 2017, Animating a Virtual Object in a Virtual World.
U.S. Appl. No. 15/421,779, filed Feb. 1, 2017, Animating a Virtual Object in a Virtual World.
U.S. Appl. No. 15/421,852, filed Feb. 1, 2017, Animating a Virtual Object in a Virtual World.
"United Kingdom Application Serial No. 1601779.0, Office Action dated Jul. 26, 2016", 5 pgs.
"United Kingdom Application Serial No. 1601775.8, Office Action dated Jul. 26, 2016", 5 pgs.
"United Kingdom Application Serial No. 1601777.4, Office Action dated Jul. 26, 2016", 5 pgs.
"U.S. Appl. No. 15/421,779, Non Final Office Action dated Mar. 21, 2018", 25 pgs.

ANIMATING A VIRTUAL OBJECT IN A VIRTUAL WORLD

CLAIM OF PRIORITY

This application claims the benefit of priority to United Kingdom Patent Application Serial No. 1601775.8, filed on Feb. 1, 2016, which is incorporated by reference herein in its entirety.

TECHNICAL FIELD

The invention relates to the technical field of the animation of a virtual object in a virtual world.

BACKGROUND

It is known to author or generate animation for one or more virtual objects (also termed "characters") that are located in a virtual environment (or virtual world), such as a three dimensional virtual environment of a video game or of a visual effects tool. The characters can consist of a hierarchy of joints, or a "rig", that form a skeleton. A skin or mesh may be overlaid (or rendered) on top of the rig to thereby visually represent the character. By updating the location and orientation of the joints (i.e. changing the geometric configuration of the rig), the posture of the character and the position of the character within the virtual world may be updated, i.e. the character may be animated.

One known technique used in the animation of characters is inverse kinematics (IK) animation. This involves: (a) specifying desired target locations and/or orientations for one or more joints of the rig; (b) performing an inverse kinematics operation that determines angles/orientations for the joints of the rig in order to achieve those target locations and/or orientations (e.g. given a target location at which it is desired for a simulated human character to place a foot, the inverse kinematics animation then determines the angles/orientations for the joints of the rig for that character in order to try to achieve a posture for the character such that the foot is then placed at the target location); and (c) setting the angles/orientations for the joints of the rig to the determined angles/orientations.

DETAILED DESCRIPTION

Figure 1:
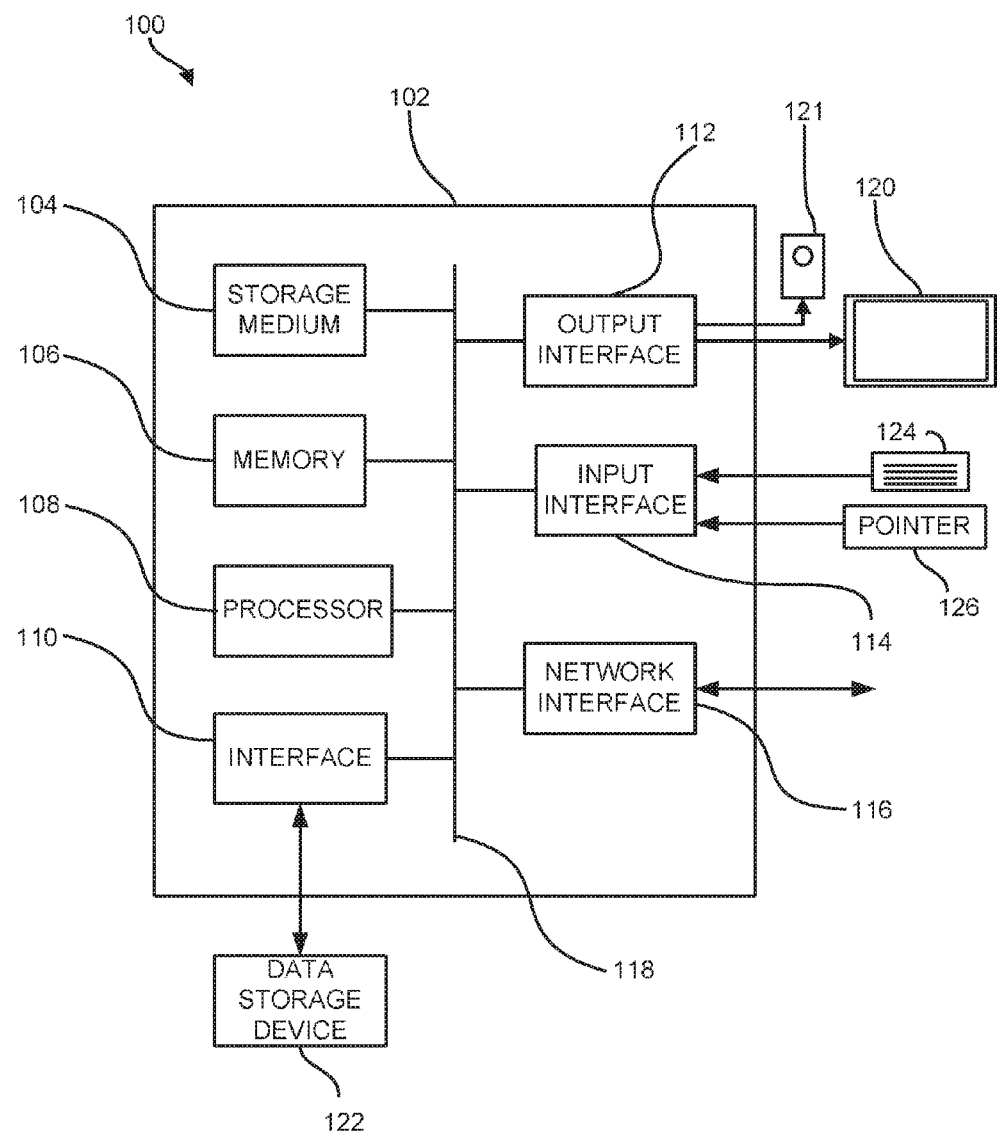
FIG. 1 schematically illustrates an example of a computer system.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

In the following embodiments, like components are labelled with like reference numerals.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Determining the desired locations of complex rigs formed of multiple joints in order to achieve the desired behaviour is complex. One method used to reduce the complexity is curve IK in which the target locations are defined along a curve defined by the animator or by a program such as a game during play. The use of the curve defining a target function to which the joints are to be aligned allows the animator or program to simply define target locations. It also constrains the search to determine the location of the joint locations to the search to fit them to the curve.

A generalized embodiment provides a method and system for use in the animation of parts of a virtual object in a virtual world in which joint data for each joint of a chain of joints associated with parts of a virtual object is obtained or accessed. Joint data can represent a current state of a rig, which requires the determination of an updated configuration. The joint data includes length data defining a vector length for a vector from the joint to a next joint. The length data corresponds to a length of a part in the virtual world.

To update the geometric data for the rig, data for a target curve defining target locations for the joints of the parts of the virtual object is accessed, and the joint data is processed. A location of a first joint is set at a first end of the chain to location of a first end of the target curve. An end target location is defined on the target curve for an end joint at a second end of the chain and intermediate locations are defined on the target curve for joints intermediate the ends of the chain based on the lengths of the vectors along the chain. The processing of the chain of joints then iterates, by identifying a joint at a location having a largest location error relative to an intermediate location on the target curve for the joint, rotating a vector for a preceding joint in the chain to minimize a distance between the end joint and the intermediate location on the target curve, rotating a vector for the identified joint to minimize the distance between the end joint and the end target location on the target curve, identifying a joint at a location having the largest location error relative to an intermediate location on the target curve for the joint, and determining a rotation to be applied to the vector for the first joint and the vector for the identified joint to fit the end joint to the end target location, and rotating the vector for the first joint and the vector for the identified joint to fit the end joint to the end target location.

In one embodiment, the determining of the rotation to be applied to the vector for the first joint and the identified joint comprises calculating a first compound vector as a vector sum for the vectors for the joints from the first joint to the identified joint and a second compound vector as a vector sum for the vectors for the joints from the identified joint to the end joint, and determining the rotation to be applied to the vector for the first joint and the vector for the identified joint in accordance with a rotation of the first and second compound vectors to fit the end joint to the end target location. The determining of the rotation of the first and second compound vectors may, in on embodiment, comprise using scalar lengths of the compound vectors and a scalar length from the first joint to the end target location in a calculation according to the law of cosines.

In order to space the intermediate target locations along the curve in a manner reflecting the spacing of the joints along the chain, in one embodiment the intermediate locations are defined using length ratios for the vectors for the joints.

In one embodiment, the processing of the joint data for the chain of joints can iterate for a predetermined number of iterations that can be predefined by a user such as an animator or it can be predetermined by a controlling program such as a computer game in which the animation process is utilized.

In another embodiment, the iterations are performed a number of times dependent upon an time or processing resources allocated by a control program, such as a computer game in which the animation process is utilized.

In one embodiment, the iterations are performed a number of times until the locations of the joints in a current iterations is within a predetermined range of the locations of the joints in a previous iteration.

In one embodiment, the iterations are carried out until a target arror in the location of the joints relative to their target locations on the curve is attained. In one embodiment, the target error for each joint is a minimum average error in the locations of the joints relative to the intermediate locations on the target curve for the joints.

In one embodiment, the distance between the ends of the curve is determined, and if the distance is equal to or less than a sum of the lengths of the vectors for the joints, the end target location is selected as a second end of the target curve. This enables the method to detect if the curve ends are located at a length or distance that is shorter than the length of the vectors for the joints and if so, the method can fix the end joint to the end of the curve. In this embodiment, of course, it is not possible, when the curve is shorter or longer than the lengths of the vectors for the joint, to fit the intermediate joints to positions on the curve. The first and end joints are fitted to the two ends of the curve and the rest are fitted as best or as close as possible to reduce a target error.

In one embodiment, the method of fitting the joints to the target curve can be used for any length of curve where the ends are separated by a distance greater than the sum of the lengths of the vectors for the joints of the chain. In this embodiment, the end target location on the target curve must be defined at a length along the target curve equal to or less than a sum of the lengths of the vectors for the joints. In effect this shortens the length of the curve to be used in the fitting process. In an alternative embodiment, the effect of shortening the curve could be a parameter acting on the generation of the curve for use in the fitting process.

Specific embodiments will now be described with reference to the drawings.

System Overview

FIG. 1 schematically illustrates an example of a computer system 100. The system 100 comprises a computer 102. The computer 102 comprises a storage medium 104, a memory 106, a processor 108, an interface 110, a user output interface 112, a user input interface 114 and a network interface 116, which are all linked together over one or more communication buses 118.

The storage medium 104 may be any form of non-volatile data storage device such as one or more of a hard disk drive, a magnetic disc, an optical disc, a ROM, etc. The storage medium 104 may store an operating system for the processor 108 to execute in order for the computer 102 to function. The storage medium 104 may also store one or more computer programs (or software or instructions or code).

The memory 106 may be any random access memory (storage unit or volatile storage medium) suitable for storing data and/or computer programs (or software or instructions or code).

The processor 108 may be any data processing unit suitable for executing one or more computer programs (such as those stored on the storage medium 104 and/or in the memory 106), some of which may be computer programs according to embodiments or computer programs that, when executed by the processor 108, cause the processor 108 to carry out a method according to an embodiment and configure the system 100 to be a system according to an embodiment. The processor 108 may comprise a single data processing unit or multiple data processing units operating in parallel, separately or in cooperation with each other. The processor 108, in carrying out data processing operations for embodiments, may store data to and/or read data from the storage medium 104 and/or the memory 106.

The interface 110 may be any unit for providing an interface to a device 122 external to, or removable from, the computer 102. The device 122 may be a data storage device, for example, one or more of an optical disc, a magnetic disc, a solid-state-storage device, etc. The device 122 may have processing capabilities—for example, the device may be a smart card. The interface 110 may therefore access data from, or provide data to, or interface with, the device 122 in accordance with one or more commands that it receives from the processor 108.

The user input interface 114 is arranged to receive input from a user, or operator, of the system 100. The user may provide this input via one or more input devices of the system 100, such as a mouse (or other pointing device) 126 and/or a keyboard 124, that are connected to, or in communication with, the user input interface 114. However, it will be appreciated that the user may provide input to the computer 102 via one or more additional or alternative input devices (such as a touch screen). The computer 102 may store the input received from the input devices via the user input interface 114 in the memory 106 for the processor 108 to subsequently access and process, or may pass it straight to the processor 108, so that the processor 108 can respond to the user input accordingly.

The user output interface 112 is arranged to provide a graphical/visual and/or audio output to a user, or operator, of the system 100. As such, the processor 108 may be arranged to instruct the user output interface 112 to form an image/video signal representing a desired graphical output, and to provide this signal to a monitor (or screen or display unit) 120 of the system 100 that is connected to the user output interface 112. Additionally or alternatively, the processor 108 may be arranged to instruct the user output interface 112 to form an audio signal representing a desired audio output, and to provide this signal to one or more speakers 121 of the system 100 that is connected to the user output interface 112.

Finally, the network interface 116 provides functionality for the computer 102 to download data or computer code from and/or upload data or computer code to one or more data communication networks.

It will be appreciated that the architecture of the system 100 illustrated in FIG. 1 and described above is merely exemplary and that other computer systems 100 with different architectures (for example with fewer components than shown in FIG. 1 or with additional and/or alternative components than shown in FIG. 1) may be used in embodiments. As examples, the computer system 100 could comprise one or more of: a personal computer; a server computer; a mobile telephone; a tablet; a laptop; a television set; a set top box; a games console; other mobile devices or consumer electronics devices; etc.

Animations and Data for Animations

Figure 2:
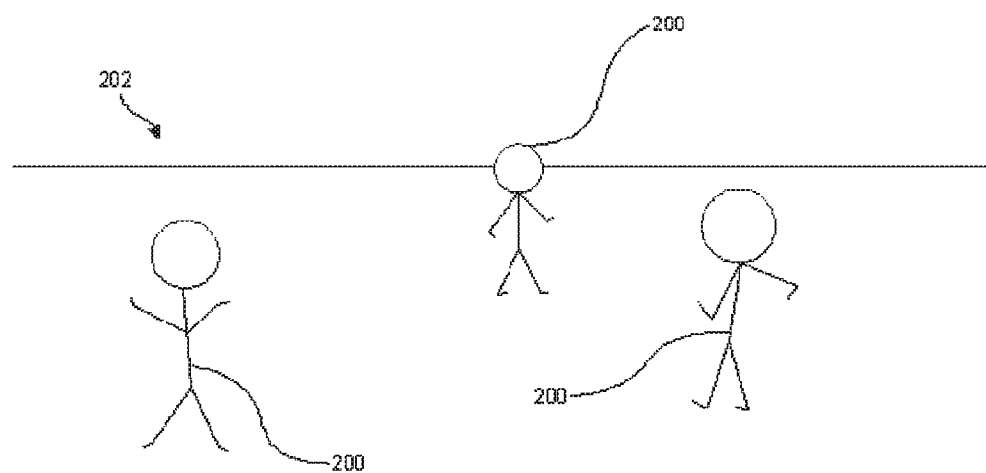
FIG. 2 schematically illustrates example virtual objects within a virtual world.

Embodiments are concerned with animations and, in particular, an animation of a virtual object (or a character) that is located (or resides) within a virtual world (or environment). FIG. 2 schematically illustrates three example virtual objects 200 within a virtual world 202. The virtual objects 200 shown in FIG. 2 (and the rest of this application) represent human beings, but it will be appreciated that embodiments are equally applicable to animations of virtual objects that represent other articles, items, animals, etc. and other types, structures and forms of object that have different intended representations. The virtual world 202 may be any virtual environment, arena or space containing the virtual objects 200 and in which the virtual objects 200 may be moved or animated. Thus, the virtual world 202 may represent a real-world location, a fictitious location, a building, the outdoors, underwater, in the sky, a scenario/location in a game or in a movie, etc. The animation of the virtual object 200 may form a part of a computer game being executed by the processor 108 of the computer system 100, with the animation being generated/computed in real-time. The animation of the virtual object 200 may be generated/computed so as to output a video animation to form part of a film/movie (in which case the generation/computation need not be in real-time). The animation of the virtual object 200 may be generated/computed for other purposes (e.g. computer simulations that involve objects moving and interacting in an environment).

An animation for an object 200 comprises performing an update process at each time point (also referred to as an animation update step) in a series of time points (or a series of animation update steps or update time points). These time-points may correspond to video frames, video fields, or any other time or display frequency of interest—for the rest of this description, the time-points shall be assumed to correspond to video frames, but it will be appreciated that this is only an example and should not be taken as limiting. For example, in some embodiments, one or more animation update steps may be carried out between successive video frames/fields and this number may or may not be constant over time. It will be appreciated that the display frequency (i.e. the frequency at which a display process displays or renders an image of the virtual world 202) need not necessarily be linked to the frequency of performing the update process. The update process performed at the animation update step updates values for attributes of (or associated with) the object 200. These attributes may correspond to, for example, the location and/or orientation of one or more object parts of the object 200 (e.g. the location and/or orientation of the limbs, neck, digits, head, etc. of a human object 200). Thus, in updating the values for the location and/or orientation object attributes, the object 200 is moved within the virtual world 202. However, the attributes associated with the object 200 are not limited to location and/or orientation object attributes, as discussed below.

In the embodiments described below, the animations relate to so-called "skeletal animation", but it will be appreciated that different types or styles of animation fall within the scope of other embodiments. The object attributes for an object 200 may be represented by some or all of the following data (depending on the type of animation and how the object 200 and its attributes are to be represented): (a) topological data; (b) geometric data; (c) trajectory data; (d) skinning data; and (e) rendering data. These data are described in more detail below. It will be appreciated that the object 200 may have attributes in addition to, or as alternatives to, the attributes as described further below with reference to the various data (a)-(e).

Figure 3:
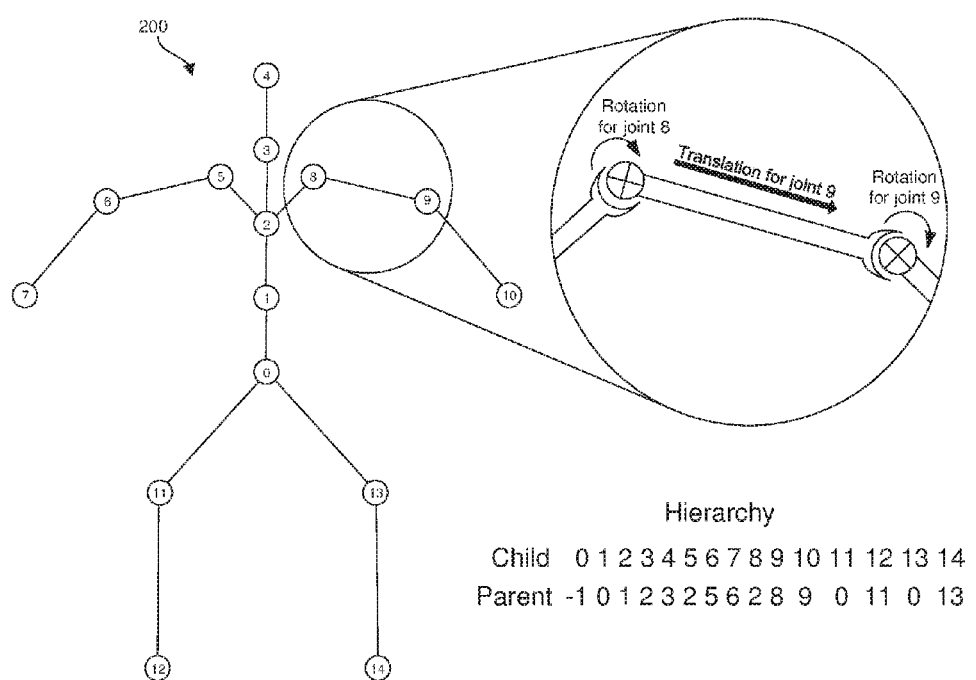
FIG. 3 schematically illustrates an object for an animation according to an embodiment.

FIG. 3 schematically illustrates an object 200 for an animation according to an embodiment. The object 200 comprises a plurality of object sections (or "bones") linked together by respective joints. In FIG. 3, the sections of the object 200 are the straight lines whilst the joints of the object 200 are the numbered circles.

In general, a joint is a (simulated) point or surface or location of contact between two or more object sections so that that joint links (or creates an association between) those sections. In other words, such a joint forms a simulated connection or tie between object sections (in the same way that, for example, a forearm is connected to an upper arm by virtue of an elbow joint). In this way, an object section may have one or more joints associated with it. A joint normally occurs at an end of the object section(s) with which it is associated.

Some joints (such as joint 10 in FIG. 3) occur at the end of an object section, but do not link that section to another section. These joints merely serve to indicate the location of the free (i.e. unconnected) end of that section.

In some embodiments, each object section is "rigid" in that the distance between the joints associated with that section is constant, although, of course, each rigid section may have its own length/distance which may be different from the length/distance for the other rigid sections. However, it will be appreciated that in other embodiments one or more of the sections of the object 200 may not be "rigid".

The object 200 may therefore be considered to comprise a plurality of object parts. In some embodiments, the topological data represents the object 200 as a plurality of joints (i.e. the object parts are just the joints). In some embodiments, the topological data represents the object 200 as a plurality of object sections (i.e. the object parts are just the bones). In some embodiments, the topological data represents the object 200 as a plurality of joints together with a plurality of object sections. The actual representation does not matter for embodiments and therefore in this description the topological data shall represent the object 200 as a plurality of joints and it will be appreciated that the use herein of the term "joint" encompasses both joints and/or bones unless stated otherwise or unless clearly not appropriate. However, the skilled person will appreciate that the following description may be applied analogously to the alternative styles of representation.

The object parts may be considered as forming a skeleton, or framework or "rig", for the object 200.

The object parts (joints in this representation) are linked together, or are associated with each other, in a hierarchy. The hierarchy of joints illustrated in FIG. 3 may be represented by table 1 below:

TABLE 1

| | Joint ID | | | | | | | | | | | | | | |
|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 |
| Parent ID | −1 | 0 | 1 | 2 | 3 | 2 | 5 | 6 | 2 | 8 | 9 | 0 | 11 | 0 | 13 |

In this hierarchy of joints for the object 200, each joint, other than a central, basis root joint (labelled with a joint ID of 0) is a child of another joint in the hierarchy, i.e. every joint other than that root joint is associated with (or linked to) a second joint in the hierarchy (by virtue of a connecting object section), where that second joint is considered to be the parent of that joint. The fact that the central joint is not a child of another joint (and therefore has no parent joint) is represented in table 1 by indicating a parent ID of −1. For example, joint 2 is a child of joint 1 and itself has three children, namely joints 3, 5 and 8. As another example, joint 10 is a child of joint 9, but has no children itself. A joint such as joint 10 that has no child joints (i.e. a joint that is not itself a parent) is included so as to represent a "terminating end" of a section of the object 200, i.e. to indicate the location of the extremities of the object 200. Due to the connecting nature of the object sections that link joints, the movement, position and orientation of a joint in the virtual world 202 is affected by the movement, position and orientation of the parent of that joint in the virtual world 202.

The topological data for the object 200 is data that represents the hierarchy (or hierarchies) or structure of the object parts, i.e. data defining the parent-child relationships between the various object parts that make up the object 200. For example, the topological data for the object 200 may be stored in the form of table 1 above.

The geometric data for the object 200 represents the relative positions and orientations of the object parts. The values given to the geometric data represent the positioning or configuration of the object 200 in a particular posture or stature. In effect, the attributes for the object 200 represented by the geometric data are the length of each object section (bone) together with that bone's orientation relative to its parent bone, i.e. this geometric data represents the distance between a joint and its parent joint, together with the orientation of that joint relative to the parent joint. There are many well-known ways of representing this geometric data, such as: (a) using respective transformation matrices for the joints; (b) using respective pairs of 3×3 rotation matrices and 1×3 translation matrices; or (c) using respective quaternions. As these methods are well-known, and as the particular method used is not important for embodiments, these methods shall not be described in more detail herein. An example representing some of the geometric data for joints 8 and 9 is shown in FIG. 3.

The geometric data for a particular joint is normally defined in a coordinate space local to the parent of that joint (i.e. in which that parent is fixed). Thus, for example, if a "shoulder joint" 8 of FIG. 3 moves but the "elbow joint" 9 of FIG. 3 does not move relative to the shoulder joint, then the geometric data 308 for the elbow joint would not change.

The skinning data is data that enables so-called "skinning" for the animation. The process of skinning is well-known in this field of technology and shall not be described in more detail herein—it takes a definition of the surface of the object 200 and attaches it to the skeleton formed by the object parts (the joints and/or bones). The skinning data is therefore data defining this object surface, which is an attribute of the object 200.

The rendering data is data that enables so-called "rendering" of the animation. The process of rendering is well-known in this field of technology and shall not be described in more detail herein—it actually outputs or displays the skinned surface with relevant textures, colours, lighting, etc. as appropriate. The rendering data is therefore data defining the textures, colours, lighting, etc., which are attributes of the object 200.

Figure 4:
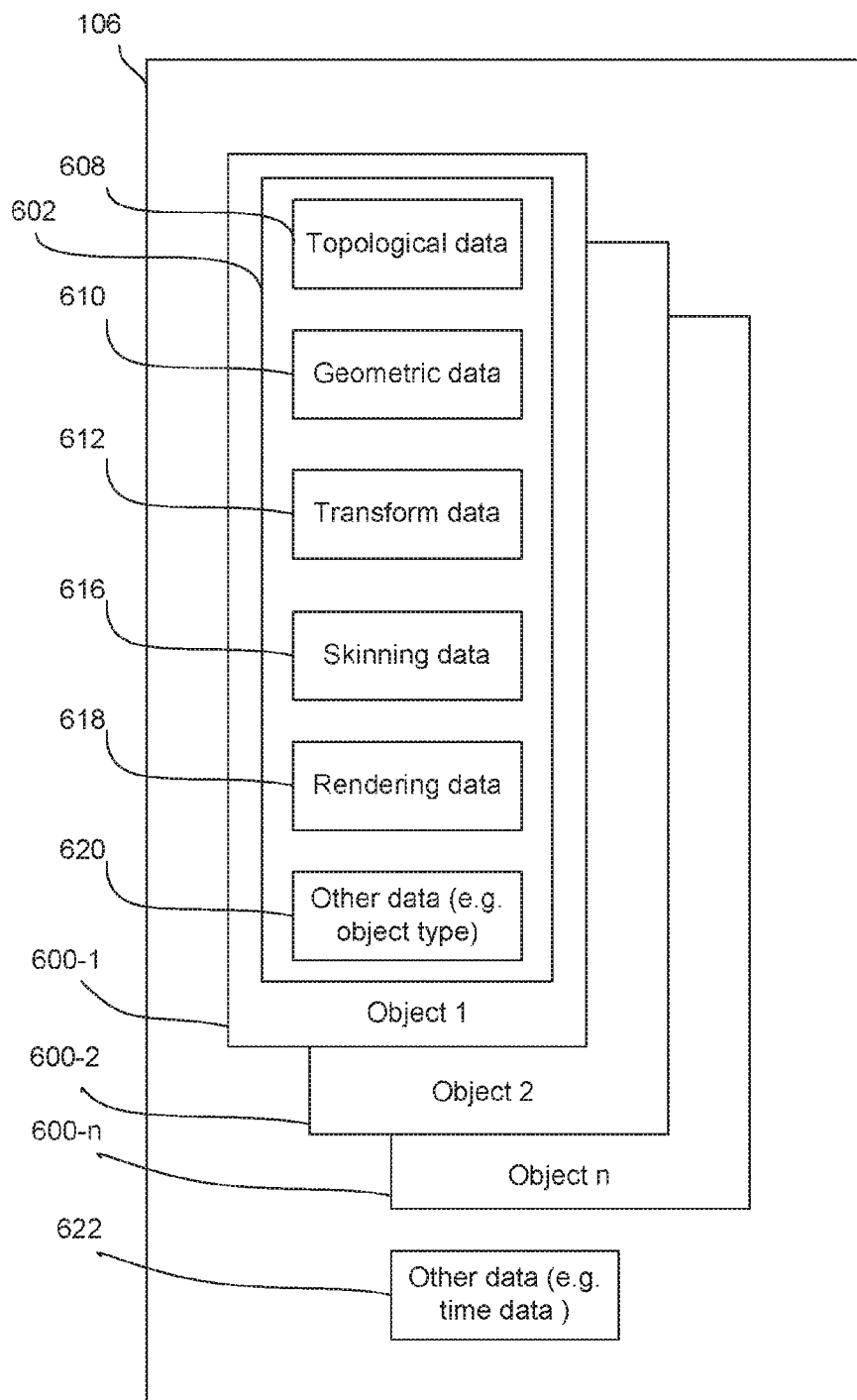
FIG. 4 schematically illustrates some of the data that may be stored in a memory of the computer system of FIG. 1 for embodiments.

FIG. 4 schematically illustrates some of the data that may therefore be stored in the memory 106 (or additionally or alternatively stored in the storage medium 104 or the data storage device 122, or which may be accessible via the network interface 116). There may be respective data 600 for one or more objects 200—in FIG. 4, there are n objects 200, each with their own data 600-1, 600-2, . . . , 600-n. The data 600 for an object 200 may include a set 602 of attribute data for that object 200, including one or more of: topological data 608; geometric data 610; transform data 612; skinning data 616; rendering data 618; and other data 620 specific to that object (e.g. a type of the object 200). There may also be stored other data 622 (such as data defining a time within a computer game or a movie; data defining or describing the virtual world 202; and curve data defining curve types for joint fitting; etc.) which is not specific to any one particular object 200.

Inverse Kinematics and Effectors

"Effectors" and "inverse kinematics" are well-known in this field of technology, but as embodiments relate to the use of effectors and inverse kinematics (referred to herein as IK), they shall be described in more detail below. However, it will be appreciated that the skilled person would be aware of effectors and IK and any known aspects of effectors and inverse kinematics that are not set out below.

An effector is a constraint or target or goal to be achieved by the IK processing. An effector is related to (or associated with, or defined/specified for) a corresponding joint of the object 200. An effector for a joint may represent a desired position and/or orientation for (or associated with) that joint of the object 200 (for example, defined either within the virtual world 202 or relative to the object 200 or relative to that joint). Examples include:

- In the animation of an object 200 representing a person moving (e.g. walking) through the virtual world 202, an effector might be specified for a neck joint and/or a head joint of the person which constrains the orientation of the neck and/or head joints so that the head faces in a particular direction, i.e. so that, during the animation, the person appears to be looking at a fixed point within the virtual world 202.
- In the animation of an object 200 representing a person, an effector may be specified for a hand joint of the person, where the effector specifies that, during the animation, the hand should be moved to a particular location within the virtual world 202 (e.g. to move towards a simulated button in the virtual world 202 so as to then press that button).
- In the animation of an object 200 representing a person, an effector may be specified for a hand joint of the person, where the effector specifies that, during the animation, the hand should point towards another object in the virtual world 202, which may be a moving object (so as to "track" that moving object).

It will be appreciated there are many other types of effector that might be specified for an animation and that the above are provided merely as examples to help demonstrate the notion of an effector.

In one embodiment, each joint of the object 200 is associated with one effector lying at a point along a defined target curve.

It will be appreciated that a curve defining the effectors may be generated dynamically, for example: depending on events that occur during a computer game or animation simulation, or based on commands that are issued by a user (e.g. when a player of a game presses one or more buttons on a game controller to instruct a game character to perform an action).

It is possible to use an IK process to derive (or calculate or determine), for one or more joints of the object 200, a joint angle, so that, when those joint angles are applied to their respective joints, the object 200 will satisfy (or at least try to satisfy) those effectors. IK is well-known in this field of technology (see, for example, http://en.wikipedia.org/wiki/Inverse_kinematics, the entire disclosure of which is incorporated herein by reference). The IK processing results in a set of effectors defining a "solution", where that solution is a set of joint angles for one or more joints of the object 200.

The process of curve IK is a method of defining a target curve on which the effectors or targets can be determined using inverse kinematics. The curve defines a function at points along which the effectors lie. The curve comprises a continuous parametric function that provides a position and geometric properties of a continuous line in 3D. Each parameter of the function defines a different position in 3D. In curve IK a continuous curve is defined by control points, namely a start control point defining a start location, and orientation for the curve and the definition of the parametric curve (the curve shape), and an end control point defining the end location of the curve. Intermediate control points may also be defined to enable control of the curve at these points e.g. to enable a twist to be applied to the curve or even to allow complex curve shapes to be defined by concatenating curve shapes (functions).

Embodiments will now be described with reference to FIGS. 5 to 9 in which the chain of joints can be best fitted (with a minimum error) to a defined target curve when the distance between the ends of the target curve is less than the length of the sum of the lengths of the vectors of the joints in a chain.

Figure 5A:
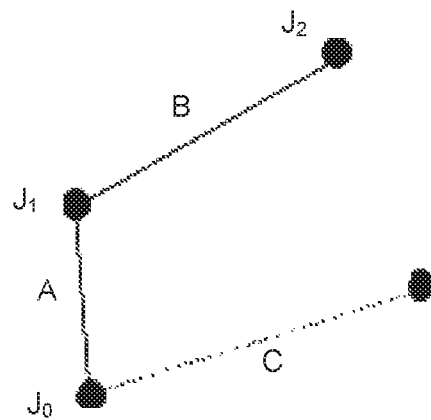
FIGS. 5a to 5c schematically illustrate a process for the fitting an end joint to a target end location on a curve according to one embodiment.
Figure 5B:
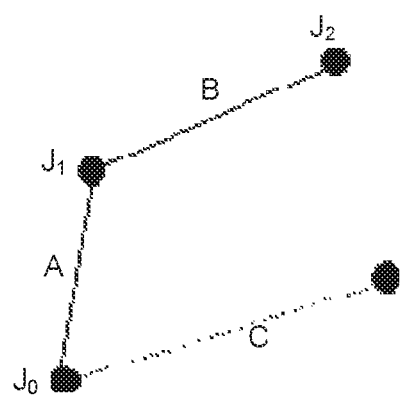
Figure 5C:
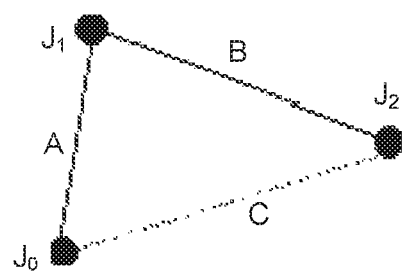

FIGS. 5a to 5c schematically illustrate the process used for fitting an end joint to a target end location on a curve according to one embodiment. The process is used as part of the iterative process to determine joint locations to best fit a target curve as will be described in more detail with reference to FIGS. 6 to 9.

The solution to the problem of how to move and end joint $J_2$ to an end target location on a curve (not shown) is illustrated in FIGS. 5a to 5c. A first joint $J_1$ is located at a first end of a curve, which is a distance C from the defined end target location, which is one embodiment is the second end of the curve. An intermediate joint $J_1$ is identified in the chain of joints and used as a third point in the process. The vectors from $J_0$ to $J_1$ is labelled A. The vector from $J_1$ to $J_2$ is labelled B. Since the lengths A, B and C are known, the position of $J_1$ can simply be determined by calculating the angle for the vector $J_0$ using:

$$J_0 = \cos^{-1}\left(\frac{A^2 + B^2 - C^2}{2AB}\right)$$

Thus, the first step of the process is to rotate the vector $J_0$ to the determined angle, as shown in FIG. 5b. Then, the rotation of $J_1$ can simply be computed as the angle required to bring the end joint $J_2$ to the end target location as shown in FIG. 5c.

The process for the determination of the locations of joints in a chain in accordance with one embodiment will now be described with reference to FIGS. 6 to 8. In this embodiment, the distance between the ends of the defined target curve is less than the total lengths of the vectors for joints of the chain of joints. Hence, it is known that the end joint can be fitted to the end target location.

Figure 6A:
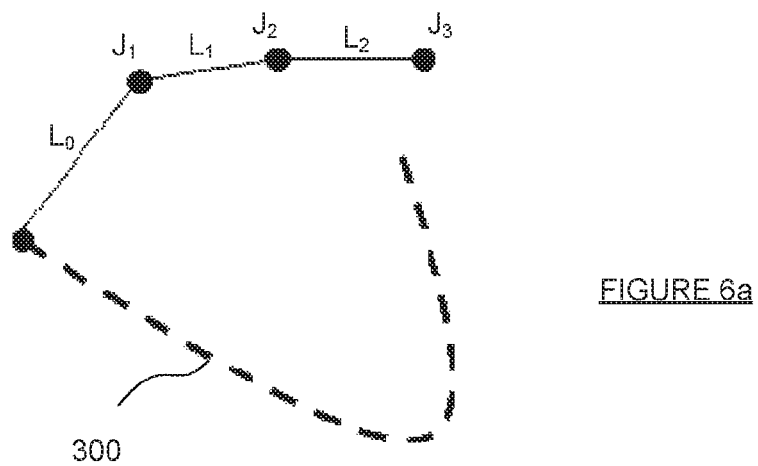
FIGS. 6a to 6h schematically illustrate a first iteration of the process for the fitting of a chain of joints to a defined target curve according to one embodiment.
Figure 6B:
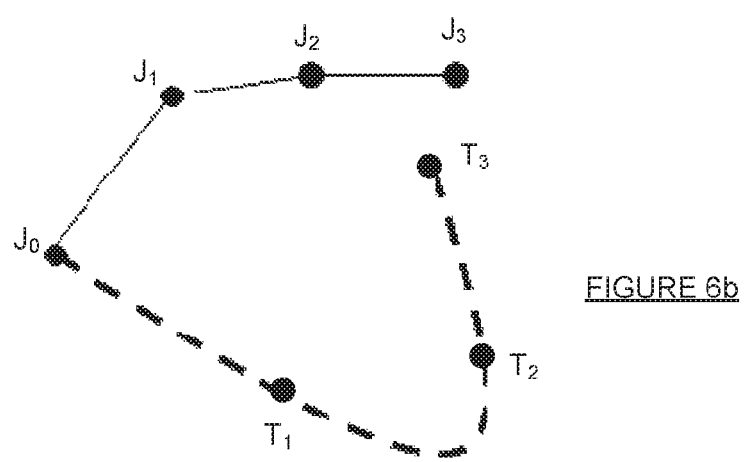

As shown in FIG. 6a, chain of joints $J_0$, $J_1$, $J_2$ and $J_3$ having vector lengths $L_0$, $L_1$, $L_2$ are set so that the initial joint $J_0$ lies at the start location of a target curve 300. The curve comprises any parametric function Q(t). Since the distance between the ends of the curve 300 is less than the sum of the lengths of the vectors $L_0$, $L_1$, $L_2$, the end target location is defined as the second end of the target curve 300. Intermediate target locations are defined based on the relative lengths of the vectors $L_0$, $L_1$, $L_2$ so that the intermediate locations are defined with the same ratio of lengths along the target curve 300, as shown in FIG. 6b.

The first and last joints are set at locations t=0 and t=1 on the curve Q(t) defined by a parameter normalized between 0 and 1. The corresponding points for the intermediate locations are determined by normalizing the lengths of the vectors. Each joint I has a corresponding point on Q(t) given by:

$$t_i = \frac{\sum_{k=0}^{k=i-1} L_k}{\sum_{k=0}^{n-1} L_k} \text{ for } 0 < i < n$$

Figure 6C:
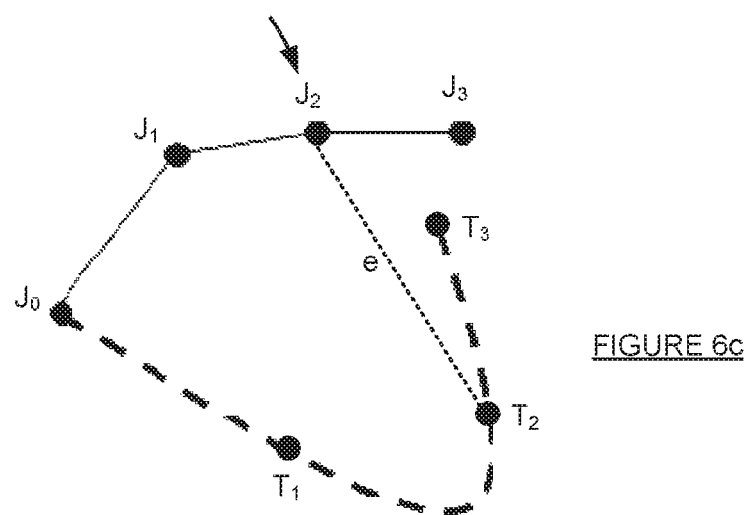

In a first iteration, as shown in FIG. 6c, a joint ($J_2$) having the largest error in its location is determined. The largest error is the largest distance from the target location for the joint on the target curve 300. The error is shown as e in FIG. 6c.

In the joint selection process, a joint is chosen according to the distance error. Error is measured as the difference between the joint position $P(j_i)$ and the position of its corresponding point in the curve.

$$e_i = \|Q(t_i) - P(j_i)\|$$

The mean error is simply $$E = \frac{\sum e_i}{n}$$

The selected joint $j_s$ is such that the difference between the error of the next joint and the mean is maximum. That is, the joint that define the maximum value of $$D_s = \|e_{s+1} - E\| \text{ for } 0 < s < n$$

Figure 6D:
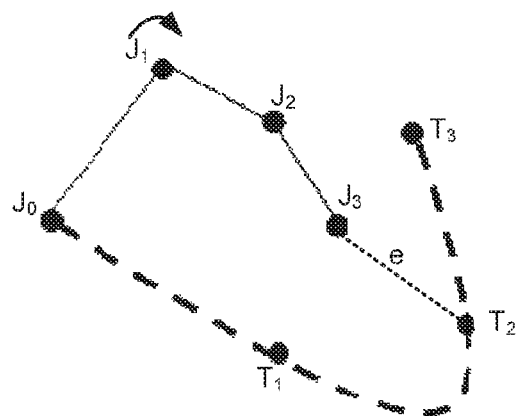
Figure 6E:
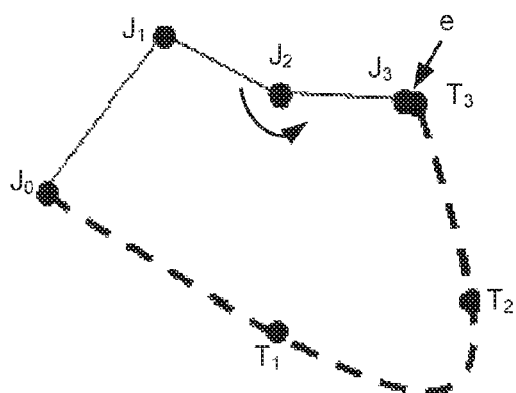

The vector for the joint $J_1$ prior to the identified joint $J_2$ is then rotated so as to minimize the distance shown as e in FIG. 6d between the end joint $J_3$ and the target location for the identified joint $J_2$. The vector for the joint $J_2$ is then rotated to minimize the error in the location of the end joint $J_3$ relative to the end target location, as shown in FIG. 6e. It can be seen in FIG. 6e that there is an error shown as e in the location of the end joint $J_3$ and the end target location. In order to fix this, the process described in FIGS. 5a to 5c is employed, as shown in FIGS. 6f to 6h.

Figure 6F:
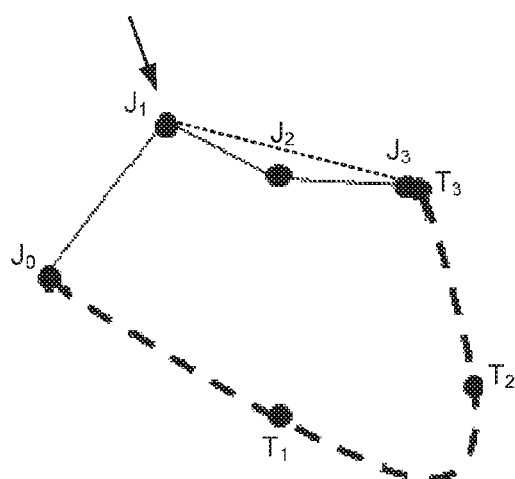
Figure 6G:
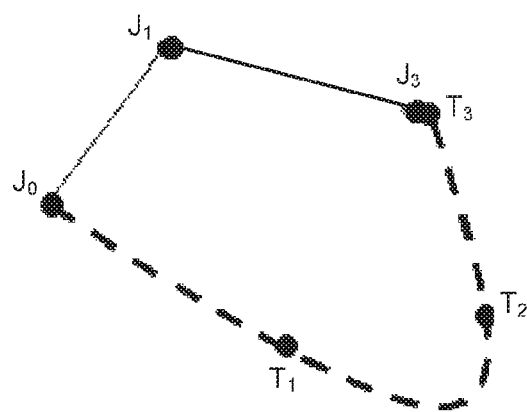
Figure 6H:
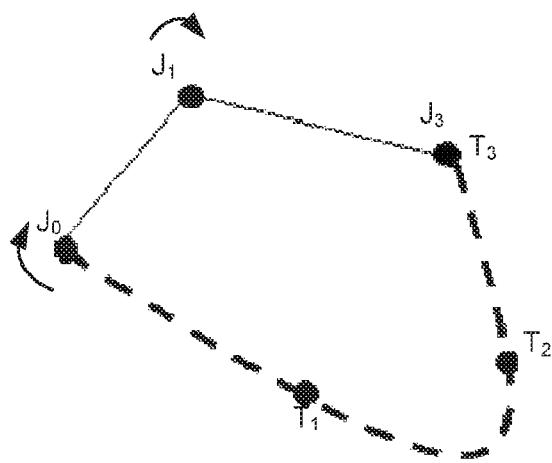

As shown in FIG. 6f, an intermediate joint having the largest error (largest distance from its target location on the curve 300) is identified, which in this example is joint $J_1$. A compound vector is determined (shown as a dotted line) as the sum of the vectors $J_1$ and $J_2$ for the joints between the identified joint and the end joint $J_3$. FIG. 6g shows the simplified vector diagram with the compound vector for joint $J_1$. This shows that the problem has been reduced to a three point problem with a start joint $J_0$, and end joint $J_3$ and an intermediate joint $J_1$. The law of cosines method of FIGS. 5a to 5c can thus be applied to determine the rotation of the vector for the first joint $J_0$ and the rotation of the intermediate joint $J_1$. The rotation is shown of the compound vector associated with $J_1$. However, since the vectors are connected in chain, once the angle of the vector $J_0$ is determined to determine the rotation to be applied to the vector for joint $J_0$, the location of joint $J_1$ is determined and the vector for joint $J_1$ can be rotated rather than the compound vector. The effect is the same due to the vectors being in a chained series. Hence, as shown in FIG. 6h, the end joint $J_3$ is fixed or fitted to the end target location. This is the end of the first iteration.

FIGS. 7a to 7e illustrate a second iteration following the same process as described with reference to FIGS. 6c to 6h.

Figure 7A:
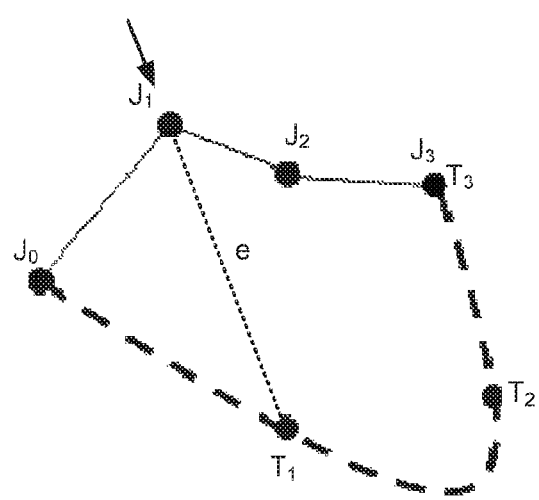
FIGS. 7a to 7e schematically illustrate a second iteration of the process for the fitting of a chain of joints to a defined target curve according to one embodiment.
Figure 7B:
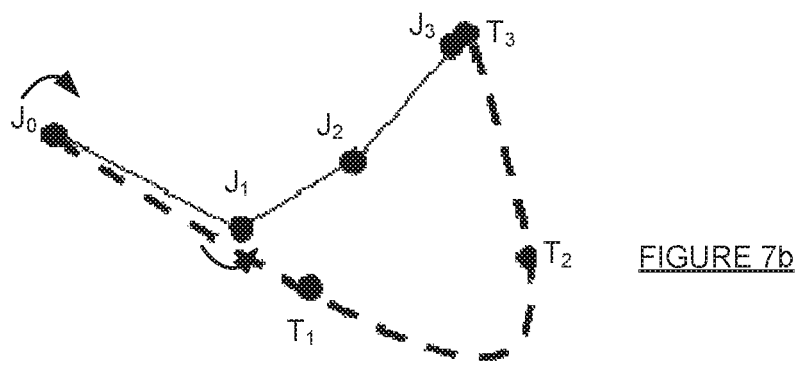
Figure 7C:
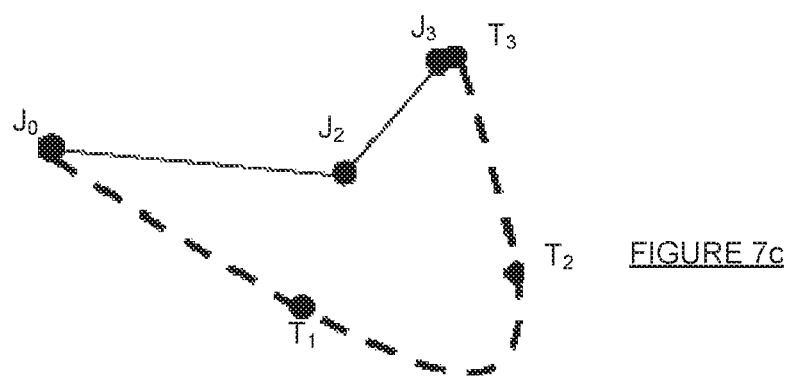
Figure 7D:
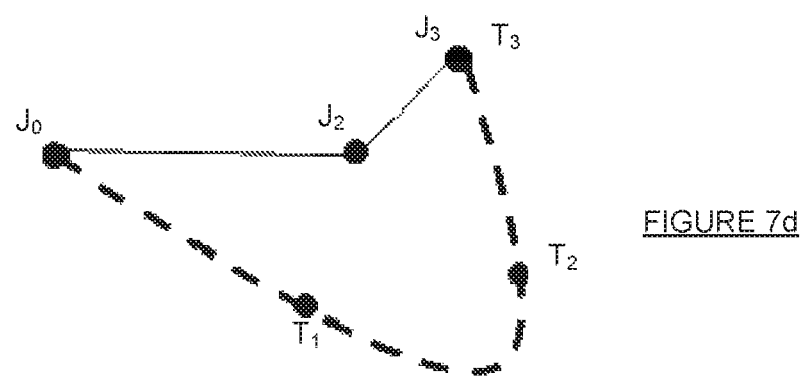
Figure 7E:
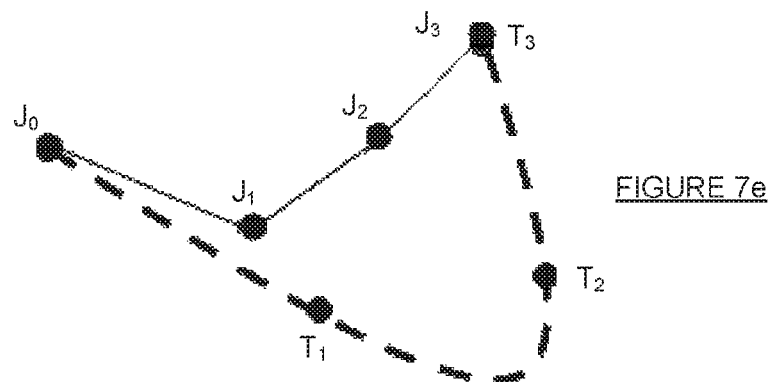

As illustrated in FIG. 7a a joint ($J_1$) having the largest error in its location is determined. The largest error is the largest distance from the target location for the joint on the target curve 300. The error is shown as e in FIG. 7a. The vector for the joint $J_0$ prior to the identified joint $J_1$ is then rotated so as to minimize the distance between the end joint $J_3$ and the target location for the identified joint $J_1$. The vector for the joint $J_1$ is then rotated to minimize the error in the location of the end joint $J_3$ relative to the end target location, as shown in FIG. 7b. It can be seen in FIG. 7b that there is an error shown as e in the location of the end joint $J_3$ and the end target location. In order to fix this, the process described in FIGS. 5a to 5c is again employed, as shown in FIGS. 7d and 7e.

An intermediate joint having the largest error (largest distance from its target location on the curve 300) is identified, which in this example is joint $J_2$. A compound vector is determined as the sum of the vectors $J_0$ and $J_1$ for the joints between the first joint $J_0$ and the identified joint $J_2$. FIG. 7c shows the simplified vector diagram with the compound vector for joint $J_0$. This shows that the problem has been reduced to a three point problem with a start joint $J_0$, and end joint $J_3$ and an intermediate joint $J_2$. The law of cosines method of FIGS. 5a to 5c can thus be applied to determine the rotation of the vector for the first joint $J_0$ and the rotation of the intermediate joint $J_2$. Hence, as shown in FIG. 7d, the end joint $J_3$ is fixed or fitted to the end target location. FIG. 7e illustrates the location of the component vectors $J_0$ and $J_1$ at the end of this second iteration (0085 FIGS. 8a to 8e illustrate a third and final iteration following the same process as described with reference to FIGS. 6c to 6h and 7a to 7e.

Figure 8A:
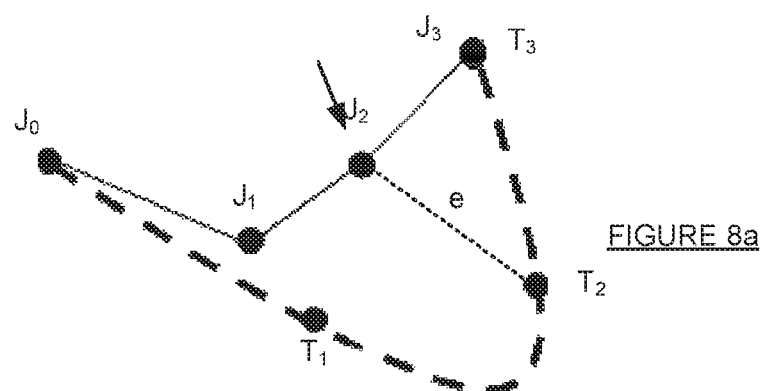
FIGS. 8a to 8e schematically illustrate a final iteration of the process for the fitting of a chain of joints to a defined target curve according to one embodiment.
Figure 8B:
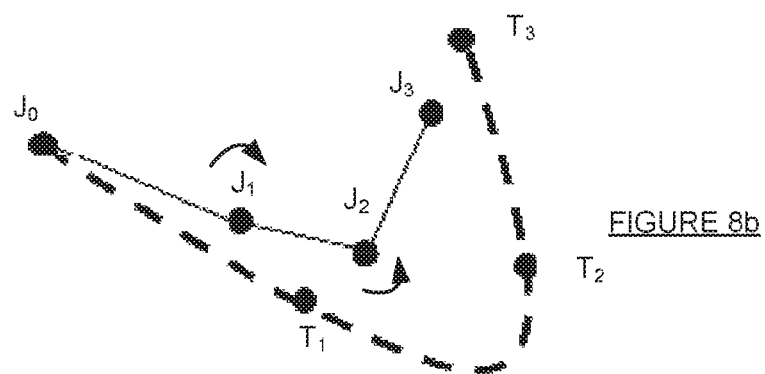
Figure 8C:
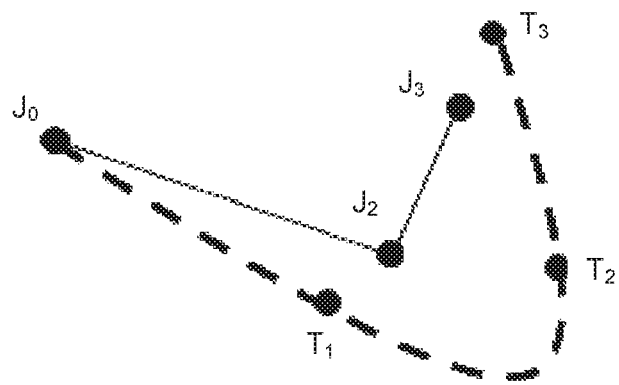
Figure 8D:
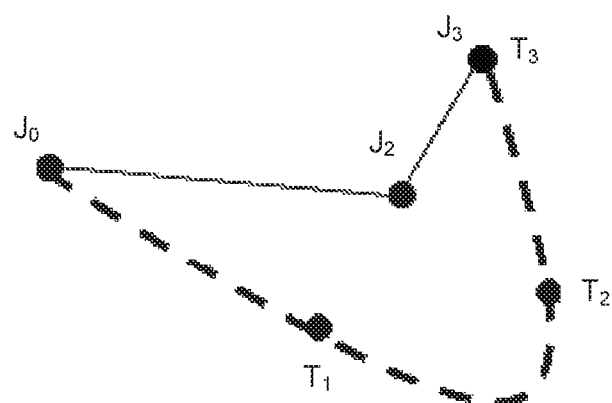

As illustrated in FIG. 8a a joint ($J_2$) having the largest error in its location is determined. The error is shown as e in FIG. 8a. The vector for the joint $J_1$ prior to the identified joint $J_2$ is then rotated so as to minimize the distance between the end joint $J_3$ and the target location for the identified joint $J_2$. The vector for the joint $J_2$ is then rotated to minimize the error in the location of the end joint $J_3$ relative to the end target location, as shown in FIG. 8b. It can be seen in FIG. 8b that there is an error in the location of the end joint $J_3$ and the end target location. In order to fix this, the process described in FIGS. 5a to 5c is again employed, as shown in FIGS. 8c and 8d.

Figure 8E:
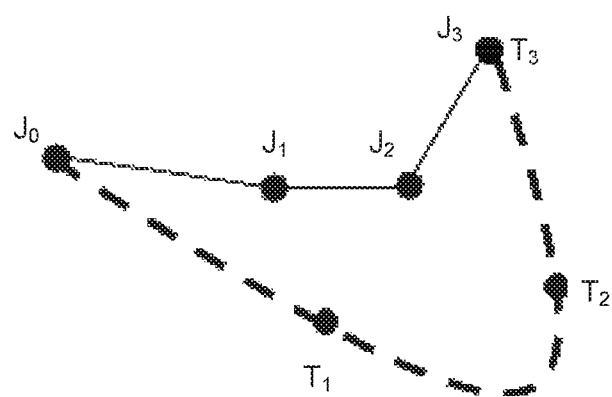

An intermediate joint having the largest error (largest distance from its target location on the curve 300) is identified, which in this example is joint $J_2$. A compound vector is determined as the sum of the vectors $J_0$ and $J_1$ for the joints between the first joint $J_0$ and the identified joint $J_2$. FIG. 8c shows the simplified vector diagram with the compound vector for joint $J_0$. This shows that the problem has been reduced to a three point problem with a start joint $J_0$, and end joint $J_3$ and an intermediate joint $J_2$. The law of cosines method of FIGS. 5a to 5c can thus be applied to determine the rotation of the vector for the first joint $J_0$ and the rotation of the intermediate joint $J_2$. Hence, as shown in FIG. 8d, the end joint $J_3$ is fixed or fitted to the end target location. FIG. 8e illustrates the location of the component vectors $J_0$ and $J_1$ at the end of this final iteration.

At the end of the third iteration it is determined that the error of the location of each intermediate joint is not greater than an average. In other words, the error is evenly distributed between the joint locations. This is hence the final iteration.

In the method described with reference to FIGS. 5 to 8, the distances than can be used in the determination of the locations of the joints relative to their target locations on the curve are the Euclidian distance, the square Euclidian distance, the Manhattan distance or the Chebyshev distance. Also, a weight can be added to each joint, so the distance is multiplied by this weight to indicate an "importance" to the joint (possible in each axis xyz).

Figure 9:
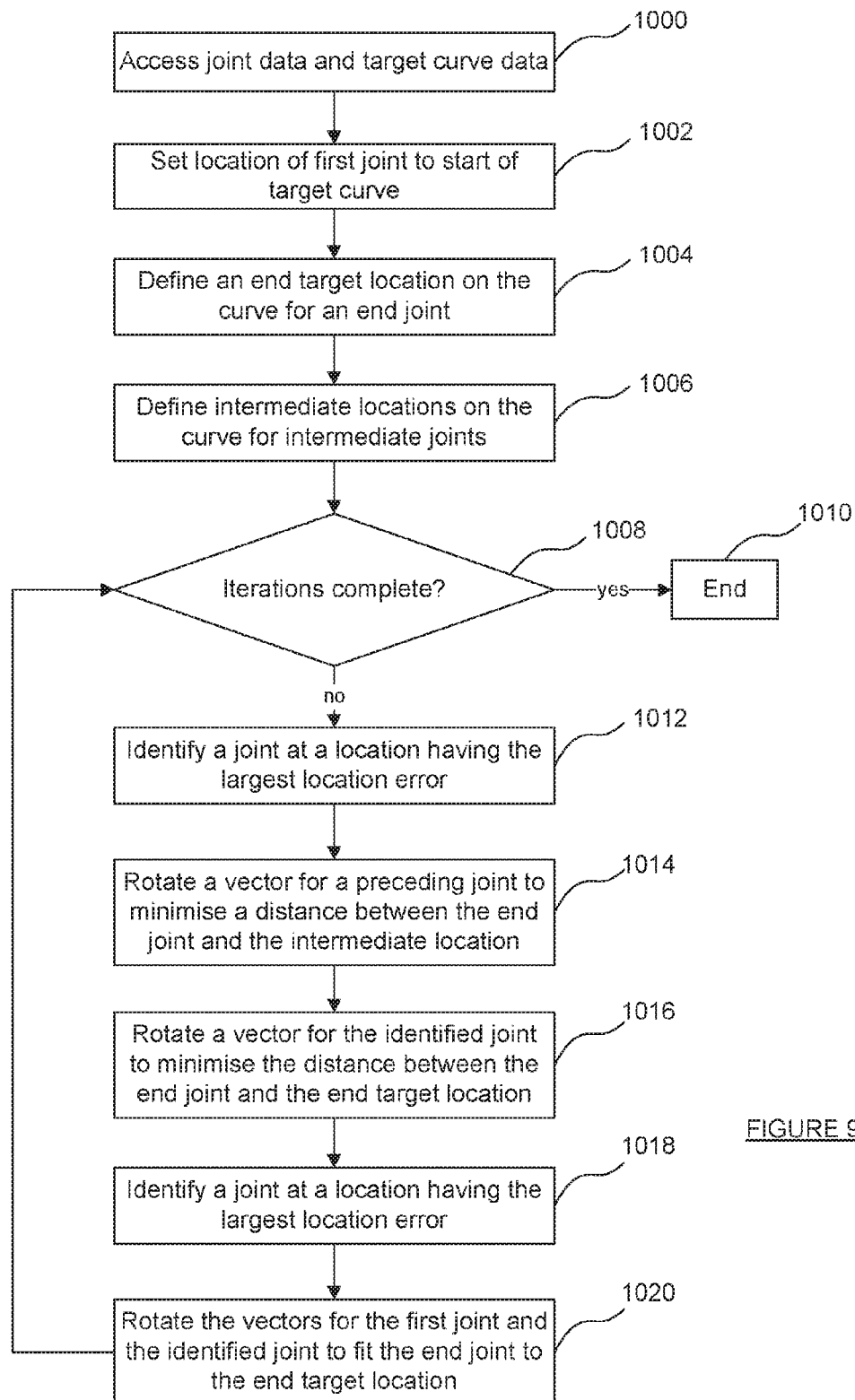
FIG. 9 is a flowchart illustrating a method for fitting joints for parts of an object to a defined curve according to one embodiment.

FIG. 9 is a flowchart illustrating a method for fitting joints for parts of an object to a defined curve according to one embodiment. The flowchart illustrates the process described above with reference to FIGS. 6a to 6h, 7a to 7e and 8a to 8e.

In step 1000 joint data for a plurality of joints in a chain is accesses along with data defining a target curve. The joint data can be stored as a current configuration of a component of a rig. The curve data can be stored or generated as a result of the requirements by an animator or a control program such as a computer game.

To initialize the process, the location of a first joint is set at a start point of the target curve in step 1002. An end target location on the curve is then defined for an end joint in step 1004. In this embodiment, since the distance between the start and end of the curve is less than the sum of the lengths of the vectors for the joints in the chain, the end target location can be defined as the end of the curve. Intermediate locations along the target curve are then defined for each of respective intermediate joints along the chain in step 1006. The locations of the target locations for the joints along the curve are defined based on the relative lengths of the vectors for the joints.

The iterative process of fitting the joints to the curve with the least error is then started in step 1008 and it is determined if the number of iterations has been completed. If so, the process terminates in step 1010. In one embodiment, the iterations can be carried out until a target location error is achieved such as a minimum average error or a minimum deviation of the location errors from an average error so that the location error is evenly distributed between the intermediate joints. In an alternative embodiment, the iterations can be carried out a number of times controlled or predetermined by a user such as an animator or by a control program, such as a game program that uses the animation process as part of the game. The number of iterations per frame can be set, although the fitting process can be running continuously. In another embodiment, the iterations are performed a number of times dependent upon an time or processing resources allocated by a control program, such as a computer game in which the animation process is utilized. In another embodiment, the iterations are performed a number of times until the locations of the joints in a current iterations are within a predetermined range of the locations of the joints in a previous iteration. How much the joint moved or how far each joint is from solutions in previous iterations can be measured. If the joint chain is close to a solution obtained in a previous frame then the process stops (this is a distance threshold determined by the user). Previous frames can be used since the technique can otherwise oscillate looking for a minimum. Hence, detecting that the fitting is close to a previous solution is an indication that the fitting has finished.

If the iterations are not finished (step 1010), in step 1012 a joint at a location having the largest location error is identified and in step 1014 a vector for a preceding joint along the chain is rotated to minimize the distance between the end joint and the end target location. In step 1016 the vector for the identified joint is then rotated to minimize the distance between the end joint and the end target location.

To then perform the fitting of the end joint to the end location, in step 1018 a joint having the greatest location error is identified and in step 1020 the vectors of the first joint and the identified joint are rotated to fit the end joint to the end target location. The process then returns to step 1008 to determine of the iterations are complete. This process is in one embodiment the process described with reference to FIGS. 5a to 5c and FIGS. 6f to 6h for example.

In the embodiment described with reference to FIGS. 6a to 6h, 7a to 7e and 8a to 8e, the ends of the curve are located at a distance less than the combined lengths of the vectors for the joints of the chain to be fitted to the curve. Also, the length of the curve is longer than the combined lengths of the vectors for the joints of the chain to be fitted to the curve.

Figure 10A:
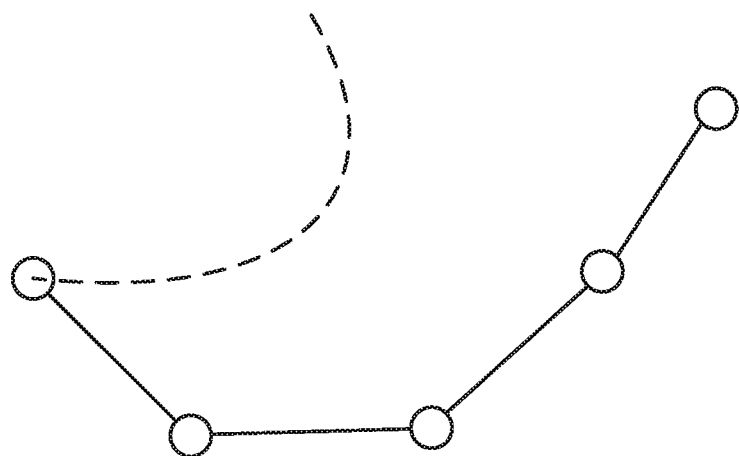
FIGS. 10a and 10b illustrate the fitting of joints to a curve in another embodiment.
Figure 10B:
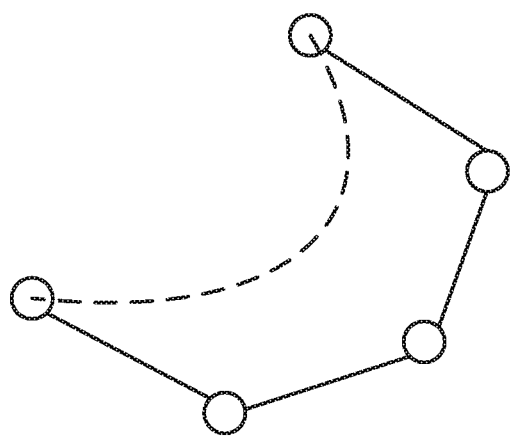

FIGS. 10a and 10b illustrate the fitting of joints to a curve in another embodiment, in which the ends of the curve are located at a distance less than the combined lengths of the vectors for the joints of the chain to be fitted to the curve and the length of the curve is shorter than the combined lengths of the vectors for the joints of the chain to be fitted to the curve.

The process for the fitting of the joints to the curve in this embodiment is as described for the embodiment described with reference to FIGS. 6a to 6h, 7a to 7e and 8a to 8e. In this embodiment, the locations of the joints lie outside the curve to accommodate the longer vectors. The fitting process can still utilize the definition of the end target location as the end of the curve in this embodiment.

Figure 11A:
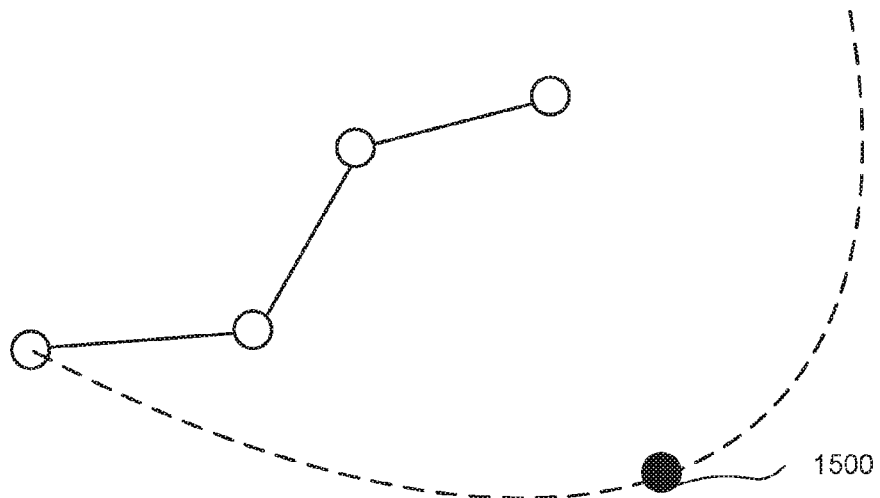
FIGS. 11a and 11b illustrate the fitting of joints to a curve in a further embodiment.
Figure 11B:
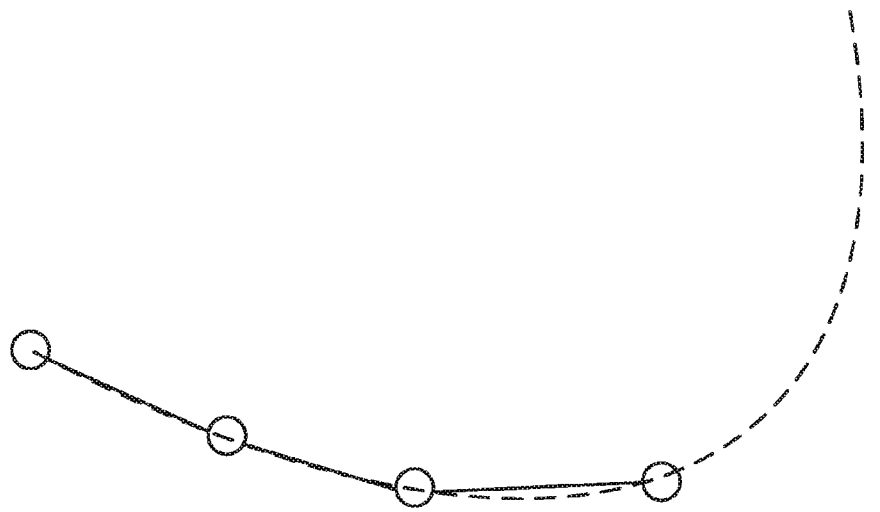

FIGS. 11a and 11b illustrate the fitting of joints to a curve in a further embodiment in which the ends of the curve are located at a distance greater than the combined lengths of the vectors for the joints of the chain to be fitted to the curve. Also, the length of the curve is longer than the combined lengths of the vectors for the joints of the chain to be fitted to the curve. This latter statement is implicit since the ends of the curve are spaced a distance greater than the combined lengths of the vectors for the joints in the chain.

The method can still be applied in this embodiment by requiring the definition of an end target location (shown as 1500 in FIG. 11a) on the curve which satisfies the requirement for the length of the curve between the start point and the end target location to be equal to or less than the combined lengths of the vectors for the joints in the chain.

The end target location is illustrated in FIG. 11a as being at a length of the curve substantially equal to the combined lengths of the vectors for the joints in the chain, causing the joints to fit to intermediate target locations substantially on the curve, as illustrated in FIG. 11b. However, the end target location 1500 can be defined to give a curve length between the start point and the end target location that is less than the combined vector lengths of the vectors for the joints in the chain. Such a defined end target location would result in a fitting process similar to that described with reference to FIGS. 6a to 6h, 7a to 7e and 8a to 8e.

The end target control point is a parameter that can be defined and controlled by an animator or a control program such as a computer game. It would generally be defined at the end of a curve but may be defined at a location along a curve.

The reason for the defining of an end target location, usually be defining the location of the end of a curve, is to define the location of the end joint and to require the intermediate joints to best fit between the first and end joints. The definition of the end joint location can be to allow an animator or control program to define a limit due for example to the position of other virtual objects in the virtual world. For example, the chain of joints being animated may comprise a tentacle reaching for a door and hence the end joint must be prevented from extending through the door in an unnatural manner.

Behaviours and Inverse Kinematics

Figure 12:
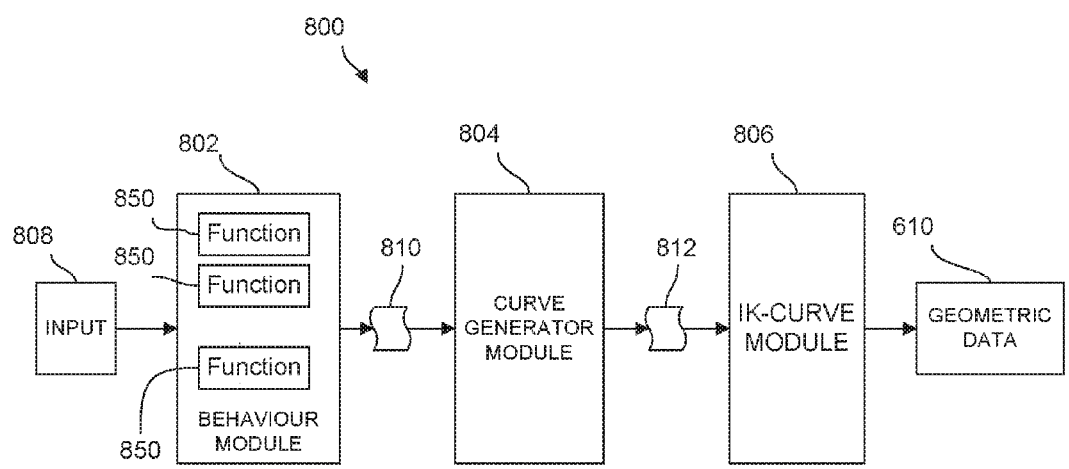
FIG. 12 schematically illustrates an example system for animating a virtual object according an embodiment.

FIG. 12 schematically illustrates an example system 800 for animating a virtual object 200, according an embodiment. The system 800 may, for example, be implemented as one or more computer programs (or one or more software modules) and may, therefore, be executed by the processor 108 of the system 100 of FIG. 1.

The virtual world 202 may comprise a plurality of objects 200, and each object 200 may have its own corresponding system 800 implemented in order to animate that object 200. Alternatively, a system 800 may be used to animate a plurality of objects 200 (e.g. by sequentially or successively updating the configuration for a plurality of objects at an animation update step, or performing such updates in parallel for the plurality of objects). The description below therefore sets out how the system 800 may be used to animate a specific object 200 (with the same operations potentially being performed for other objects 200 in the virtual world 202).

The system 800 comprises a behaviour module 802, a curve generator module 804 and an IK-curve module 806. In summary, the behaviour module 802 is arranged to receive a set of one or more input parameters 808 (or data or information) and to determine, from this set of input parameters 808, behaviour data 810 for a virtual object 200. As shall become apparent, the behaviour data 810 specifies (or defines) one or more behaviour parameters that enable the curve generator module 804 to generate a curve suitable for controlling the required position of joints for parts of the object 200. The behaviour data 810 is output from the behaviour module 802 and is received (or obtained/accessed) by the curve generator module 804. The curve generator module 804 is arranged to use the behaviour data 810 to generate curve data 812—the curve data 812 specifies (or defines) a control function on which the effectors are located for the fitting of the joints to cause the joints to achieve the desired positions. The curve data 812 can be stored as part of the data in memory 106 and is output from the curve generator module 804 to be received (or obtained/accessed) by the IK-curve module 806. The IK-curve module 806 then uses the curve control function specified by the curve data 812 to perform curve IK processing to determine the joint positions to define the angles for joints of the component of the object 200, i.e. to update the geometric data 610 for the component of the object 200 (as has been discussed above) using the process described with reference to FIGS. 5 to 11.

Each parameter in the set of one or more input parameters 808 may be an amount of data or a value representing a quantity intended to influence or control the behaviour (or animation or movement) of the object 200 for a next animation update step of the animation. The set of input parameters 808 may, therefore, include one or more parameters that are one or more of:

Inputs from a user (or some other controller of a game or animation tool). For example, the user inputs may identify a desired movement of the object 200, potentially including one or more properties of the movement such as a direction in which the object 200 is to move, a style in which the object 200 is to move, etc. (e.g. "move left", "crouch", "run at 70% of maximum running speed", etc.).

One or more predetermined inputs (such as default animation data for the object 200).

Data indicating how the object 200 has interacted with the virtual environment 202. This data could include, for example, an indication that a part of the object 200 has collided, or made contact, with a part of its virtual world 202 (e.g. another object within the virtual world 202), or that the object 200 is approaching another object within the virtual world 202 (with the intention then being that the object 200 should then be animated to take an evasive or protective manoeuvre).

Other data or information about the state of the object 200 and/or the virtual world 202.

The behaviour module 802 comprises, or is arranged to execute, one or more predetermined functions 850. The predetermined functions 850 may each make use of one or more of the parameters from the set of input parameters 808 to influence how the object 200 is to be animated. The behaviour module 802 uses the outputs of the predetermined functions 850 to determine behaviour data 810 for the object 200.

The predetermined functions 850 may be viewed as "abilities" or "tasks" for the object 200. For example one or more of the following may be implemented for the behaviour module 802:

One predetermined function 850 may be arranged to try to control the object 200 so as to simulate how the object 200 would respond to being "wounded" (for example when the input parameters 808 indicate that the object 200 has been wounded). This may be achieved by setting a behaviour (as specified in the behaviour data 810) for an arm so that a hand joint at the end of the arm will be moved to cover, or be located at, the wound.

Another predetermined function 850 may be arranged to control the object 200 so as to try to cause the object 200 to remain in a balanced posture, for example by setting a behaviour (as specified in the behaviour data 810) for one or more feet joints of the object 200. Such a function may make use of input parameters 808 that specify the nature of the surface on which the object 200 is positioned, together with input parameters 808 specifying other influences that may be acting on the object 200.

Another predetermined function 850 could be arranged to control the object 200 to simulate the object 200 defending itself from an attack, such as by setting a behaviour (as specified in the behaviour data 810) for an arm or leg to move joints of that arm or leg to block or repel another object in the virtual world 202.

Another predetermined function 850 could be arranged to set a behaviour (as specified in the behaviour data 810) for a head of the object 200 to control a joint for the head so that the head remains oriented and facing towards a particular point or object within the virtual world 202.

Another predetermined function 850 could be to control the object 200 to simulate the character walking, running, or performing some other predetermined movement, by setting one or more behaviours (as specified in the behaviour data 810) for corresponding parts of the object 200.

Another predetermined function 850 could be to control the object 200 to perform a predetermined interaction with another object in the virtual world 202 (such as pressing a button or picking up an object), by setting one or more behaviours (as specified in the behaviour data 810) for corresponding parts of the object 200.

Another predetermined function 850 could be to control the object 200 to collide with another object in the virtual world 202 in a particular manner, by setting one or more behaviours (as specified in the behaviour data 810) for corresponding parts of the object 200, such as by specifying a target location and a target velocity for the collision for one or more parts of the object 200.

Other abilities may, of course, be provided for by other predetermined functions 850. Indeed, the behaviour module 802 may be arranged to receive, as an input, animation data for (or defining) a predetermined animation (e.g. a "walk" animation or a "run" animation), and the behaviour module 802, or one of its predetermined functions 850, may be arranged to pass this animation (in the form of behaviour data 810) to the curve generator module 804.

Some of the predetermined functions 850 may be specific to a subset of joints or bones of the object 200, thereby outputting behaviour data just in relation to those specific joints or bones; other predetermined functions 850 may determine behaviour data for the whole object 200.

At any given animation update step, a predetermined function 850 may generate new behaviour data to specify one or more behaviours for the object 200, or may not generate new behaviour data. For example, if a predetermined function 850 is arranged to try to control the object 200 so as to simulate how the object 200 would respond to being "wounded" (for example when the input parameters 808 indicate that the object 200 has been wounded), then that predetermined function 850 may generate and output new behaviour data if the input parameters 808 change to indicate that the object 200 has been wounded, whereas it might not generate and output new behaviour data if the input parameters do not change to indicate that the object 200 has been wounded. Thus, at any given animation update step, the behaviour module 802 may generate new behaviour data 810 to specify one or more behaviours for the object 200, or may not generate new behaviour data 810.

By making use of individual predetermined functions 850, the behaviour module 802 is made modular, which makes it easier to add and extend different aspects of character behaviour. For example, if a new ability for the object 200 is to be implemented, such as an ability to point a hand (at the end of an arm limb) at a location or object within the virtual world 202, then a new predetermined function 850 for that ability may be created (in isolation) and added to the behaviour module 802 without affecting the already-existing predetermined functions 850. It will be appreciated, however, that the behaviour module 802 may be implemented itself as a single predetermined function 850 (albeit perhaps more complex and involved than the more modular approach set out above).

The behaviour module 802 takes the outputs from each predetermined function 850 and generates, or determines, the behaviour data 810 for the object 200. Some of the predetermined functions 850 may each wish to control how a particular joint or bone is to be controlled or moved. For example, if the set of input parameters 808 indicates that the object 200 has received a wound and is also being attacked, then one of the predetermined functions 850 that responds to the object 200 being "wounded" may wish to move a hand joint to cover the wound, whilst another one of the predetermined functions 850 that responds to the object 200 being "attacked" may wish to move that same hand joint so as to defend the object 200 from the attack. The behaviour module 802 may arbitrate between the outputs of multiple predetermined functions 850 in order to generate the output behaviour data 810. This arbitration can be achieved in any suitable way, such as: by forming the behaviour data 810 using a weighted combination of the individual configurations/targets output by each of the predetermined functions 850; by ignoring individual configurations/targets output by some of the predetermined functions 850 (in preference of individual configurations/targets output by other predetermined functions 850) in certain circumstances; etc.

Hence, the output from the behaviour module 802 comprises behaviour data 810 for the object 200. The behaviour data 810 may take many different forms. In general, though, the behaviour data 810 specifies, or defines, for one or more object parts (e.g. joints) of the object 200, a corresponding behaviour. Thus, the behaviour data 810 may comprise, one or more behaviour parameters that define or specify that behaviour.

Figure 13:
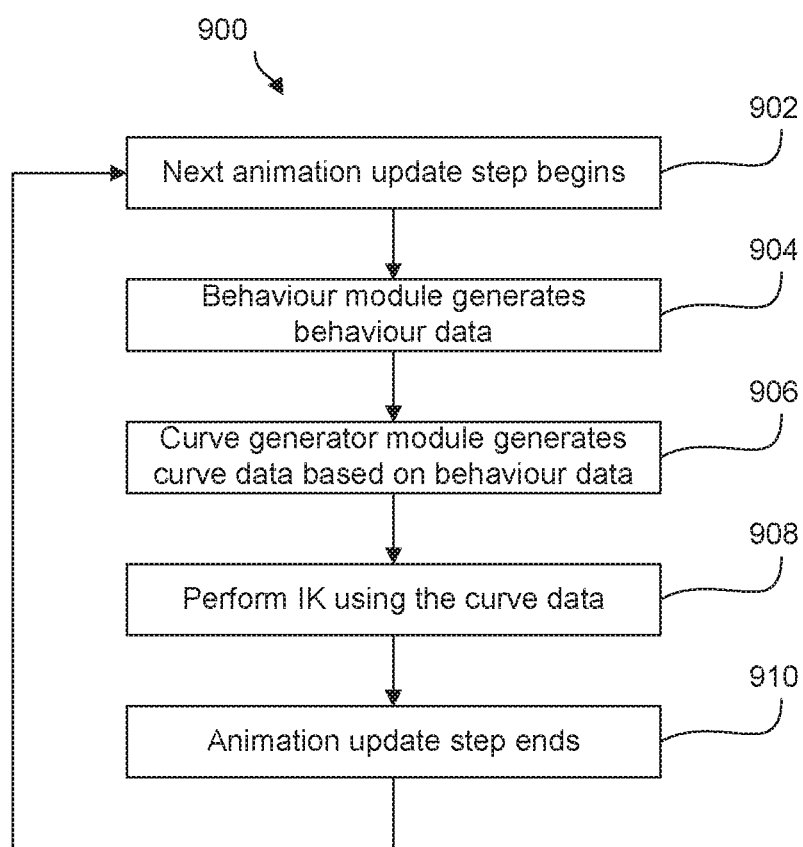
FIG. 13 is a flowchart illustrating a method for animating an object using the system of FIG. 12 according to an embodiment.

FIG. 13 is a flowchart illustrating a method 900 for animating an object 200 using the system 800 of FIG. 12 according to an embodiment.

At a step 902, a next animation update step (in the sequence/series of animation update steps) begins. This "next" animation update step is then the "current" animation update step.

At an optional step 904, the behaviour module 802 generates and outputs (or updates) the behaviour data 810. For example, the behaviour module 802 may be arranged to generate (or determine) and output the behaviour data 810 at each animation update step based on the current set of input parameters 808. However, this step 904 is optional because the behaviour module 802 may be arranged to generate and output (or update) the behaviour data 810 at an animation update step only if there has been a change to the set of input parameters 808 since the preceding animation update step (in which case, the behaviour module 802 may be arranged to detect or determine whether there has been a change to the set of input parameters 808 for the current animation update step relative to the immediately preceding animation update step).

The actual generation of the behaviour data 810 based on input parameters 808 that the behaviour module 802 receives (or accesses/obtains) has been described above.

The behaviour module 802 may store the behaviour data 810, for example as part of the data 620 for the object 200—thus, if the behaviour module 802 generates new behaviour data 810 at the current animation update step, then that new behaviour data 810 is available as part of the data 620, whereas if the behaviour module 802 does not generate new behaviour data 810 at the current animation update step, then previously generated behaviour data 810 is available as part of the data 620. Additionally, or alternatively, the behaviour module 802 may provide the behaviour data 810 to the curve generator module 804 (either at each animation update step, regardless of whether new behaviour data 810 has been generated at the current animation update step, or only at an animation update step at which new behaviour data 810 has been generated).

At a step 906, the curve generator module 804 receives (or obtains/accesses) the behaviour data 810. As set out above, the curve generator module 804 may receive the behaviour data 810 directly from the behaviour module 802 (potentially at each animation update step or only at an animation update step at which new behaviour data 810 has been generated by the behaviour module 802). Alternatively, the curve generator module 804 may access stored behaviour data 810 (e.g. from the data 620).

As mentioned above, the behaviour data 810 specifies (or defines), for one or more object parts of the object 200, a corresponding behaviour. At the step 906, for each of these one or more object parts for which a behaviour has been defined, the curve generator module 804 generates a curve defining a control function based on the behaviour data.

Thus, the curve generator module 804 generates the curve data 812 at the step 906. The curve generator module 804 may store the curve data 812, for example as part of the data 620 for the object 200. Additionally, or alternatively, the curve generator module 804 may provide the curve data 812 to the IK-curve module 806.

At a step 908, the IK-curve module 806 receives (or obtains/accesses) the curve data 812. As set out above, the IK-curve module 806 may receive the curve data 812 directly from the curve generator module 804. Alternatively, the IK-curve module 806 may access stored curve data 812 (e.g. from the data 620).

At the step 908, the IK-curve module 806 performs a curve IK operation, based on the curve data determined for each of the one of more object parts for which the behaviour data 810 specified a behaviour. The IK-curve module 806 uses the curve control function specified by the curve data 812 to perform IK curve processing to determine the effector positions and hence the locations and angles for joints of the component of the object 200, i.e. to update the geometric data 610 for the object 200 (as has been discussed above) using the process described with reference to FIG. 5 to FIG. 11. This curve IK operation updates a configuration for the effectors associated with the object parts of the object 200 and updates the position and orientation of the object parts, i.e. the curve IK operation updates the geometric data 610 for the object 200.

At a step 910, the current animation update step ends. This may involve, for example, rendering an image representing the updated configuration of the object 200 (e.g. to depict the animation of the object 200 on the screen 120) and/or saving (or storing) data indicative of the update to the geometric data 610 for the object 200 (so that an animation of the object 200 can be rendered at a later point in time based on this stored data). Other processing may be performed (e.g. to update other data 622 for a game involving the object 200, the update being based on the updated configuration for the object 200, such as scoring game points or losing game lives or proceeding to a next stage in the game, etc).

Processing may then return to the step 902 in order to perform a further animation update step in the sequence of animation update steps.

Thus, the system 800 will determine, for one or more object parts of the object 200, a corresponding behaviour and, at each animation update step of a sequence of one or more animation update steps: for each of the one or more object parts, perform a curve generation for that object part; and perform a curve inverse kinematics operation to determine the updated effectors for each of the object parts, to update a configuration for the plurality of object parts of the object 200. These one or more animation update steps are animation update steps that (a) include the animation update step at which behaviour(s) is/are determined and behaviour data 810 specifying the determined behaviours is generated and (b) zero or more subsequent animation update steps. Once new behaviour data 810 is generated by the behavior module 802, then the behaviours specified by that new behaviour data 810 may relate to some or all of the same object parts as the previous target data 810 (in which case the behaviours specified by the new behaviour data 810 for these object parts may or may not be the same as the behaviours specified by the previous behaviour data 810 for these object parts) and/or may relate to different object parts from those for the previous target data 810, and the curve generator module 804 will perform its curve generation based, at least in part, on the behaviours specified by the new behaviour data 810.

Curve Types

In the illustrated in FIGS. 6 to 8, 10 and 11, a simple curve function has been described. Embodiments of the invention are however applicable to any parametric curve, including complex curves.

Figure 14:
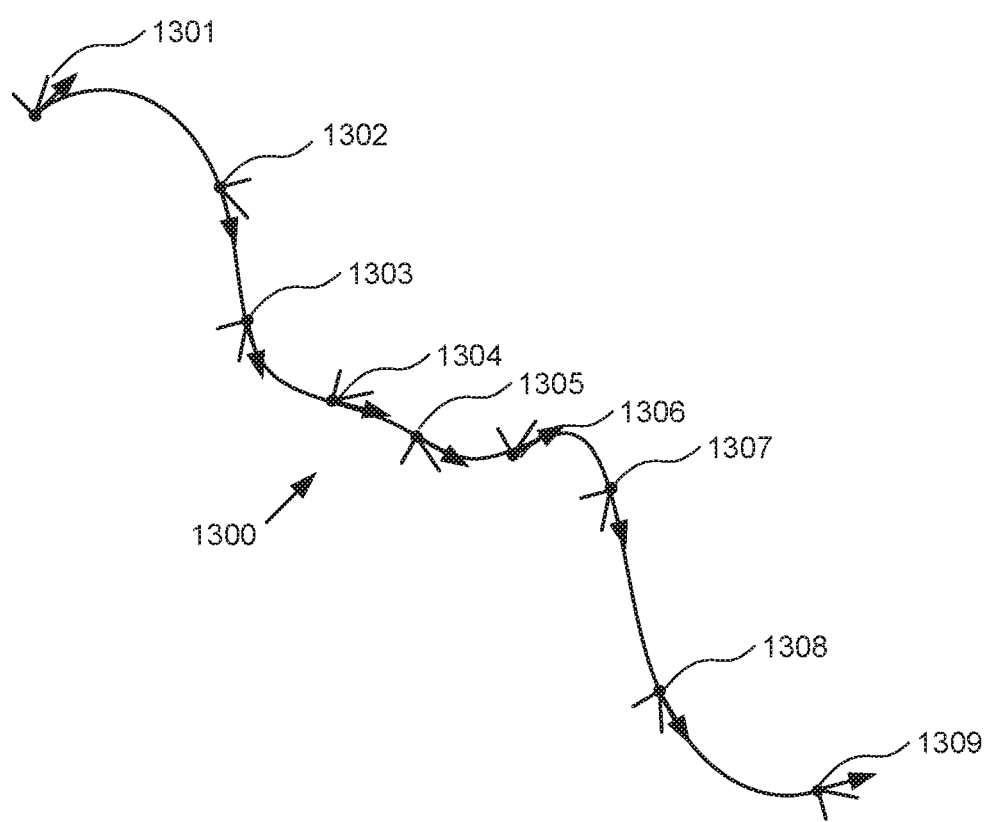
FIG. 14 schematically illustrates a more complex target curve used to define the target locations according to an alternative embodiment.

FIG. 14 illustrates a complex curve of an embodiment, in which the curve 1300 is formed from concatenated curve functions indicated by sequential control start points 1301, 1302, 1303, 1304, 1305, 1306, 1307, 1308 and 1309 (the end control point). Intermediate control points (not shown) can also be defined for each curve. The control points can define a rotation or twisting of the function to be applied along the length between control points.

In an alternative embodiment, the curve illustrated in FIG. 14 comprises a single curve function having nine control points illustrated as points 1301, 1302, 1303, 1304, 1305, 1306, 1307, 1308 and 1309 in FIG. 14.

In order to meet the animation requirements of an animator or a program such as a game program, the curve can be acted upon either by acting on the parameters for control points to define a new instantiation of a curve object type or by acting to redefine the curve type.

One aspect provides a non-transient storage medium storing computer code for controlling a computer to carry out the method. Embodiments can be implemented in programmable digital logic that implements computer code. The code can be supplied to the programmable logic, such as a processor or microprocessor, on a carrier medium. One such form of carrier medium is a non-transitory medium that carries or stores the code, such as a solid-state memory, magnetic media (hard disk drive), or optical media (Compact disc (CD) or digital versatile disc (DVD)).

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

The invention claimed is:

1. A computer implemented method for use in animating parts of a virtual object in a virtual world, the method comprising:
   accessing joint data for each joint of a chain of joints associated with parts of a virtual object, joint data including length data defining a vector length for a vector from the joint to a next joint, the length data corresponding to a length of a part in the virtual world;
   accessing data for a target curve for use in defining possible target locations for the joints of the parts of the virtual object; and
   processing the joint data to:
     set a location of a first joint at a first end of the chain to location of a first end of the target curve;
     define an end target location on the target curve for an end joint at a second end of the chain;
     define intermediate locations on the target curve for joints intermediate the ends of the chain based on the lengths of the vectors along the chain; and for a number of iterations, repeatedly:
  identify a joint at a location having a largest location error relative to an intermediate location on the target curve for the joint;
  rotate a vector for a preceding joint in the chain to minimize a distance between the end joint and the intermediate location on the target curve;
  rotate a vector for the identified joint to minimize the distance between the end joint and the end target location on the target curve;
  identify a joint at a location having the largest location error relative to an intermediate location on the target curve for the joint; and
  determine a rotation to be applied to the vector for the first joint and the vector for the identified joint to fit the end joint to the end target location, and rotating the vector for the first joint and the vector for the identified joint to fit the end joint to the end target location.

2. A method according to claim 1, wherein determining the rotation to be applied to the vector for the first joint and the identified joint comprises calculating a first compound vector as a vector sum for the vectors for the joints from the first joint to the identified joint and a second compound vector as a vector sum for the vectors for the joints from the identified joint to the end joint, and determining the rotation to be applied to the vector for the first joint and the vector for the identified joint in accordance with a rotation of the first and second compound vectors to fit the end joint to the end target location.

3. A method according to claim 2, wherein the determining of the rotation of the first and second compound vectors comprises using scalar lengths of the compound vectors and a scalar length from the first joint to the end target location in a calculation according to the law of cosines.

4. A method according to claim 3, wherein the first compound vector $J_0$ is rotated according to the equation:

$$J_0 = \cos^{-1}\left(\frac{A^2 + B^2 - C^2}{2AB}\right)$$

wherein A is the first compound vector scalar length, B is the second compound vector scalar length, and C is the scalar length from the first joint to the end target location.

5. A method according to claim 4, wherein the rotation of the second compound vector is determined as the rotation required to fit the location of the end joint to the end target location.

6. A method according to claim 1, wherein the intermediate locations are defined using length ratios for the vectors for the joints.

7. A method according to claim 1, wherein the end target location on the target curve is defined at a length along the target curve equal to or less than a sum of the lengths of the vectors for the joints.

8. A method according to claim 1, including determining the distance between the ends of the target curve, and if the distance is less than or equal to a sum of the lengths of the vectors for the joints, the end target location is defined as a second end of the target curve.

9. A method according to claim 1, wherein the iterations are performed a predetermined number of times.

10. A method according to claim 1, wherein the iterations are performed a number of times dependent upon an allocated time or processing resources.

11. A method according to claim 1, wherein the iterations are performed a number of times until the locations of the joints in a current iterations is within a predetermined range of the locations of the joints in a previous iteration.

12. A method according to claim 1, including performing the iterations until a target error for each joint is reached which is a minimum average error in the locations of the joints relative to the intermediate locations on the target curve for the joints.

13. A computer system for use in animating parts of a virtual object in a virtual world, the computer system comprising:
  a program memory storing program code; and
  a processor for implementing the program code stored in the program memory;
  wherein the program code comprises:
  code for controlling the processor to access joint data for each joint of a chain of joints associated with parts of a virtual object, joint data including length data defining a vector length for a vector from the joint to a next joint, the length data corresponding to a length of a part in the virtual world;
  code for controlling the processor to access data for a target curve for use in defining possible target locations for the joints of the parts of the virtual object; and
  code for controlling the processor to process the joint data to:
    set a location of a first joint at a first end of the chain to location of a first end of the target curve;
    define an end target location on the target curve for an end joint at a second end of the chain;
    define intermediate locations on the target curve for joints intermediate the ends of the chain based on the lengths of the vectors along the chain; and
    for a number of iterations, repeatedly:
      identify a joint at a location having a largest location error relative to an intermediate location on the target curve for the joint;
      rotate a vector for a preceding joint in the chain to minimize a distance between the end joint and the intermediate location on the target curve;
      rotate a vector for the identified joint to minimize the distance between the end joint and the end target location on the target curve;
      identify a joint at a location having the largest location error relative to an intermediate location on the target curve for the joint; and
      determine a rotation to be applied to the vector for the first joint and the vector for the identified joint to fit the end joint to the end target location, and rotating the vector for the first joint and the vector for the identified joint to fit the end joint to the end target location.

14. A computer system according to claim 13, wherein the code for controlling the processor to determine the rotation to be applied to the vector for the first joint and the identified joint comprises code for controlling the processor to calculate a first compound vector as a vector sum for the vectors for the joints from the first joint to the identified joint and a second compound vector as a vector sum for the vectors for the joints from the identified joint to the end joint, and determine the rotation to be applied to the vector for the first joint and the vector for the identified joint in accordance with a rotation of the first and second compound vectors to fit the end joint to the end target location.

15. A computer system according to claim 14, wherein the code for controlling the processor to determine the rotation of the first and second compound vectors comprises code for controlling the processor to use scalar lengths of the compound vectors and a scalar length from the first joint to the end target location in a calculation according to the law of cosines.

16. A computer system according to claim 15, wherein the code for controlling the processor comprises code to rotate the first compound vector $J_0$ according to the equation:

$$J_0 = \cos^{-1}\left(\frac{A^2 + B^2 - C^2}{2AB}\right)$$

wherein A is the first compound vector scalar length, B is the second compound vector scalar length, and C is the scalar length from the first joint to the end target location.

17. A computer system according to claim 16, wherein the code for controlling the processor to determine the rotation of the second compound vector comprises code for controlling the processor to determine the rotation as the rotation required to fit the location of the end joint to the end target location.

18. A computer system according to claim 13, wherein the code for controlling the processor includes code for controlling the processor to define the intermediate locations using length ratios for the vectors for the joints.

19. A computer system according to claim 13, wherein the code for controlling the processor includes code for controlling the processor to define the end target location on the target curve at a length along the curve equal to or less than a sum of the lengths of the vectors for the joints.

20. A non-transient storage medium storing computer code for controlling a computer to:
    access joint data for each joint of a chain of joints associated with parts of a virtual object, joint data including length data defining a vector length for a vector from the joint to a next joint, the length data corresponding to a length of a part in the virtual world;
    access data for a target curve for use in defining possible target locations for the joints of the parts of the virtual object; and
    process the joint data to:
        set a location of a first joint at a first end of the chain to location of a first end of the target curve;
        define an end target location on the target curve for an end joint at a second end of the chain;
        define intermediate locations on the target curve for joints intermediate the ends of the chain based on the lengths of the vectors along the chain; and
        for a number of iterations, repeatedly:
            identify a joint at a location having a largest location error relative to an intermediate location on the target curve for the joint;
            rotate a vector for a preceding joint in the chain to minimize a distance between the end joint and the intermediate location on the target curve;
            rotate a vector for the identified joint to minimize the distance between the end joint and the end target location on the target curve;
            identify a joint at a location having the largest location error relative to an intermediate location on the target curve for the joint; and
            determine a rotation to be applied to the vector for the first joint and the vector for the identified joint to fit the end joint to the end target location, and rotating the vector for the first joint and the vector for the identified joint to fit the end joint to the end target location.

* * * * *